US012671489B2

(12) United States Patent　(10) Patent No.: US 12,671,489 B2
Jin et al.　(45) Date of Patent: Jun. 30, 2026

(54) CONFIGURATION METHOD OF COMMUNICATION PATH FOR PORTABLE COMMUNICATION DEVICE AND PORTABLE COMMUNICATION DEVICE SUPPORTING THE SAME

(71) Applicant: Samsung Electronics Co., Ltd., Suwon-si (KR)

(72) Inventors: Suho Jin, Suwon-si (KR); Jaebum Bae, Suwon-si (KR); Dongju Lee, Suwon-si (KR); Hyeontae Cho, Suwon-si (KR); Yonggil Han, Suwon-si (KR); Bongsub Kim, Suwon-si (KR); Jinwan An, Suwon-si (KR); Jonghoon Woo, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 18/455,232

(22) Filed: Aug. 24, 2023

(65) Prior Publication Data

US 2024/0097771 A1　Mar. 21, 2024

Related U.S. Application Data

(63) Continuation of application No. PCT/KR2023/012419, filed on Aug. 22, 2023.

(30) Foreign Application Priority Data

Sep. 19, 2022　(KR) ........................ 10-2022-0117671
Oct. 17, 2022　(KR) ........................ 10-2022-0133395

(51) Int. Cl.
*H04B 7/08*　(2006.01)
*H04B 7/0426*　(2017.01)
*H04W 72/0453*　(2023.01)

(52) U.S. Cl.
CPC ........... *H04B 7/082* (2013.01); *H04B 7/0426* (2013.01); *H04W 72/0453* (2013.01)

(58) Field of Classification Search
CPC .... H04B 7/082; H04B 7/0426; H04B 7/0413; H04W 72/0453
See application file for complete search history.

(56) References Cited

U.S. PATENT DOCUMENTS 8,126,021 B2　2/2012　Wang et al.
9,628,136 B2　4/2017　Braun et al.
(Continued)

FOREIGN PATENT DOCUMENTS

JP　2015-088058　5/2015
KR　10-0729306　6/2007
(Continued)

OTHER PUBLICATIONS

Search Report and Written Opinion dated Dec. 14, 2023 issued in International Patent Application No. PCT/KR2023/012419.

*Primary Examiner* — Yu-Wen Chang
(74) *Attorney, Agent, or Firm* — Nixon & Vanderhye, P.C.

(57) ABSTRACT

The disclosure relates to a method for processing a communication path in a portable communication device, which includes: identifying whether at least some of a plurality of active elements included in a communication circuit disposed between an antenna and a communication processor are in an abnormal state and, based on an abnormal state of a first active element supporting delivery of a signal of a first frequency band among the plurality of active elements being detected, controlling the portable communication device to deliver the signal of the first frequency band based on a second active element different form the first active element (Continued)

among the plurality of active element, and a portable communication device supporting the same.

19 Claims, 18 Drawing Sheets

(56)                    References Cited

U.S. PATENT DOCUMENTS

| | | |
|---|---|---|
| 10,244,519 B2 | 3/2019 | Cesares Cano et al. |
| 10,409,686 B2 | 9/2019 | Maeda et al. |
| 11,228,336 B2 | 1/2022 | Lee |
| 11,251,540 B2 | 2/2022 | Kim et al. |
| 11,258,523 B2 | 2/2022 | Son et al. |
| 11,689,242 B2 | 6/2023 | Lee |
| 11,870,472 B2 | 1/2024 | Zhang |
| 2008/0119232 A1 | 5/2008 | Oh et al. |
| 2012/0307724 A1 | 12/2012 | Wang et al. |
| 2016/0380664 A1 | 12/2016 | Braun et al. |
| 2017/0149110 A1* | 5/2017 | Kroening ................ H01Q 1/50 |
| 2017/0181133 A1 | 6/2017 | Cesares Cano et al. |
| 2018/0137008 A1 | 5/2018 | Maeda et al. |
| 2019/0115972 A1* | 4/2019 | Braun ................... H04W 24/04 |
| 2020/0389236 A1 | 12/2020 | Son et al. |
| 2021/0218158 A1 | 7/2021 | Kim et al. |
| 2021/0288676 A1 | 9/2021 | Zhang |
| 2022/0321151 A1* | 10/2022 | Zhu .......................... H01Q 3/22 |
| 2022/0345172 A1* | 10/2022 | Blin ........................ H04B 1/44 |
| 2023/0070699 A1* | 3/2023 | Patel ................... H04B 1/0075 |
| 2023/0155635 A1* | 5/2023 | Seyed ................. H04B 7/0602 |
| | | 370/280 |
| 2023/0208483 A1 | 6/2023 | Cha et al. |

FOREIGN PATENT DOCUMENTS

| | | |
|---|---|---|
| KR | 20080045837 A | 5/2008 |
| KR | 20080111566 A | 12/2008 |
| KR | 10-2017-0115870 | 10/2017 |
| KR | 10-2019-0026449 | 3/2019 |
| KR | 20190088216 A | 7/2019 |
| KR | 10-2021-0130063 | 10/2021 |
| KR | 10-2022-0028918 | 3/2022 |

* cited by examiner

```
TIME(sys)   FILE          LINE  STRING
18.995149   rfc_cmw.cpp   3185  ==============================================
18.995149   rfc_cmw.cpp   3185  Physical devices Check
18.995150   rfc_cmw.cpp   3185  ==============================================
18.995150   rfc_cmw.cpp   3185  Dev Inst, BUS, MID, PID, USID, STATUS
18.995150   rfc_cmw.cpp   3185  ==============================================
18.995543   rfc_cmw.cpp   3185   0,  0, 0x0,   0x0,   0xffffffff, PRESENT(0)
18.995936   rfc_cmw.cpp   3185   1,  2, 0x0,   0x0,   0xffffffff, PRESENT(0)
18.996183   rfc_cmw.cpp   3185   2, 36, 0x217, 0x33c, 0x4, PRESENT(0)
18.996433   rfc_cmw.cpp   3185   3, 33, 0x217, 0x33c, 0x4, PRESENT(0)
18.996691   rfc_cmw.cpp   3185   4, 37, 0x217, 0x33c, 0x4, PRESENT(0)
18.996993   rfc_cmw.cpp   3185   5, 36, 0x217, 0x711, 0xa, PRESENT(0)
18.997284   rfc_cmw.cpp   3185   6, 32, 0x217, 0x260, 0xa, PRESENT(0)
18.997579   rfc_cmw.cpp   3185   7, 33, 0x217, 0x712, 0x8, PRESENT(0)
18.997874   rfc_cmw.cpp   3185   8, 33, 0x217, 0x712, 0x3, PRESENT(0)
18.998167   rfc_cmw.cpp   3185   9, 32, 0x217, 0x814, 0x9, PRESENT(0)
18.998460   rfc_cmw.cpp   3185  10, 37, 0x217, 0x712, 0x8, NG(2)
18.998756   rfc_cmw.cpp   3185  11, 37, 0x217, 0xa14, 0x2, NG(2)
18.999041   rfc_cmw.cpp   3185  12, 34, 0x217, 0x814, 0x9, NG(2)
18.999329   rfc_cmw.cpp   3185  13, 37, 0x217, 0x714, 0x1, PRESENT(0)
18.999622   rfc_cmw.cpp   3185  14, 34, 0x217, 0x26a, 0x2, PRESENT(0)
18.999911   rfc_cmw.cpp   3185  15, 37, 0x217, 0x212, 0x3, PRESENT(0)
19.000196   rfc_cmw.cpp   3185  16, 32, 0x217, 0x213, 0x4, PRESENT(0)
19.000493   rfc_cmw.cpp   3185  17, 34, 0x217, 0x409, 0x3, PRESENT(0)

==============================================
RFC CMW PHYSICAL DEVICES
==============================================
[10] GEN_DEVICE   MISSING_FATAL   1   Qualcomm(0x217)   0x712
[11] GEN_DEVICE   MISSING_FATAL   1   Qualcomm(0x217)   0xa14
[12] GEN_DEVICE   MISSING_FATAL   1   Qualcomm(0x217)   0x814
```

DEFECT IN PART ASSOCIATED WITH UPPER DRX MODULE

FIG. 3

| CA Combo Item |
| --- |
| B1A[4];A[1] |
| B3A[4];A[1] |
| B7A[4];A[1] |
| B1A[4];A[1] + B3A[4] |
| B1A[4];A[1] + B7A[4] |
| B7A[4];A[1] + B7A[4] |

| CA Combo Item |
| --- |
| B1A[2];A[1] |
| B3A[2];A[1] |
| B7A[2];A[1] |
| B1A[2];A[1] + B3A[2] |
| B1A[2];A[1] + B7A[2] |
| B7A[2];A[1] + B7A[2] |

| EXAMPLE OF BLOCK RX PATH SETTING TABLE (AMERICA) | | | |
|---|---|---|---|
| Block path | BAND | Rx Path<br>PRx MIMO : 3rd Rx<br>DRx MIMO : 4th Rx | TIS<br>(Total Isotropic<br>Sensitivity) |
| Block | B2 | PRx MIMO | −90.5dBm |
| Use DRx | B2 | DRx MIMO | −92.8dBm |
| Block | B25 | PRx MIMO | −91dBm |
| Use DRx | B25 | DRx MIMO | −93.5dBm |
| Block | B66 | PRx MIMO | −90dBm |
| Use DRx | B66 | DRx MIMO | −94.5dBm |
| Use DRx | B30 | PRx MIMO | −90dBm |
| Block | B30 | DRx MIMO | −89.7dBm |
| Use DRx | B41 | PRx MIMO | −90dBm |
| Block | B41 | DRx MIMO | −89dBm |
| Use DRx | B48 | PRx MIMO | −91dBm |
| Block | B48 | DRx MIMO | −88.8dBm |

FIG.8

| Korean INTER ULCA COMBO LIST | | |
|---|---|---|
| SKT | KT | LGU+ |
| 1A-5A | 1A-8A | 1A-5A |
| 3A-5A | 3A-8A | 5A-7A |
| 5A-7A | 1A-3A | 1A-7A |
| 1A-3A | | |
| 1A-7A | | |
| 3A-7A | | |

FIG.9

| NR5G CA Combo | SRS(Ant SW) | DESCRIPTION |
|---|---|---|
| N41A[100x4];A[100x2] | SRS_T2_R4 | DEACTIVATE N41 UL MIMO COMBO |
| N41A[100x4];A[100x2] + N28A[30x2] | SRS_T2_R4 | |
| N41A[100x4];A[100x2] + N41A[100x4] | SRS_T2_R4 | |
| | | |
| N41A[100x4];A[100x1] | SRS_T1_R4 | USE N41 UL SA |
| N41A[100x4];A[100x1] + N28A[30x2] | SRS_T1_R2 | |
| N41A[100x4];A[100x1] + N41A[100x4] | SRS_T1_R2 | |
| N41A[100x4];A[100x1] + N79A[100x4] | SRS_T1_R2 | |
| N28A[30x2];A[30x1] + N41A[100x4] | SRS_T1_R4 | |
| B3A[4];A[1] + N41A[4];A[1] | SRS_T1_R4 | |
| B39A[2];A[1] + N41A[4];A[1] | SRS_T1_R4 | |

FIG.11

100
PORTABLE COMMUNICATION DEVICE

200
BASE STATION

DETECT WHETHER
COMMUNICATION PATH
IS DEFECTIVE          ~1301

DETERMINE WHETHER
IT IS NECESSARY TO
CHANGE UE CAPABILITY   ~1303

DELIVER CHANGED UE CAPA AS RRC
MESSAGE TO BASE STATION (1305)

rrc Reconfiguration (1307)

rrc Reconfiguration
Complete (1309)

PORTABLE COMMUNICATION DEVICE OPERATES AS CHANGED UE CAPA   ~1311

```
E-ARFCN = 900
        Num of cell = 1
        Cells[0] {
           Valid Rx = RX0_RX1_RX2_RX3
           Logical To Physcal Rx Map = {0,1,2,3}
           Serving Cell Index = PCell
           Serving Cell Index = PCell
           Current SFN = 468
           Current Subframe Number = 6
           Inst RSRP Rx[0] = -126.06 dBm
           Inst RSRP Rx[1] = -127.69 dBm
           Inst RSRP Rx[2] = -155.75 dBm
           Inst RSRP Rx[3] = -126.81 dBm
           Inst Measured RSRP = -126.06 dBm
           Filtered RSRP = -126.06 dBm
           Inst RSRQ Rx[0] = -14.19 dB
           Inst RSRQ Rx[1] = -14.31 dB
           Inst RSRQ Rx[2] = -30.00 dB
           Inst RSRQ Rx[3] = -12.63 dB
           Inst RSRQ = -14.19 dB
           Filtered RSRQ = -14.13 dB
           FTL SNR Rx[0] = -0.80 dB
           FTL SNR Rx[1] = -1.50 dB
           FTL SNR Rx[2] = -12.90 dB
           FTL SNR Rx[3] = 1.70 dB
           CINR RX 0 = -314
           CINR RX 1 = -337
           CINR RX 2 = -32768
           CINR RX 3 = -485
        }
```

CONFIGURATION METHOD OF COMMUNICATION PATH FOR PORTABLE COMMUNICATION DEVICE AND PORTABLE COMMUNICATION DEVICE SUPPORTING THE SAME

CROSS-REFERENCE TO RELATED APPLICATIONS

This application is a continuation of International Application No. PCT/KR2023/012419 designating the United States, filed on Aug. 22, 2023, in the Korean Intellectual Property Receiving Office and claiming priority to Korean Patent Application Nos. 10-2022-0117671, filed on Sep. 19, 2022, and 10-2022-0133395, filed on Oct. 17, 2022, in the Korean Intellectual Property Office, the disclosures of all of which are incorporated by reference herein in their entireties.

BACKGROUND

Field

The disclosure relates to a configuration of a communication path for a portable communication device.

DESCRIPTION OF RELATED ART

A portable communication device may establish a communication channel with a base station using various elements of a communication circuit. The various elements of the communication circuit may include a communication processor, a converter, an amplifier, a filter, a switch, and an antenna. The various elements of the communication circuit may have characteristics provided to establish a communication channel with a base station of a specific communication service provider. Thus, when the portable communication device is provided to cover a plurality of frequency bands, it may include various more complicated elements. Recently, the portable communication device uses a carrier aggregation (CA) technology using a plurality of frequency bands to use a plurality of carriers to improve data transmission capability and includes a communication circuit including various hardware parts to transmit and receive signals through the plurality of frequency bands.

SUMMARY

According to various example embodiments, a portable communication device is provided. The portable communication device may include: a communication processor, at least one antenna, and a communication circuit disposed between the communication processor and the at least one antenna and including a plurality of active elements located on a plurality of radio frequency communication paths configured to respectively or selectively support a plurality of radio frequency bands. The communication processor according to an example embodiment may be configured to: identify whether at least some of the plurality of active elements are in an abnormal state and, based on an abnormal state of a first active element supporting delivery of a signal of a first frequency band among the at least some of the plurality of active elements being identified, may control the portable communication device to change a communication path including the first active element to a communication path including a second active element different from the first active element among the plurality of active elements for the signal of the first frequency band.

According to various example embodiments, a method for processing a communication path in a portable communication device is provided. The method may include: identifying whether at least some of a plurality of active elements included in a communication circuit disposed between an antenna and a communication processor are in an abnormal state and, based on an abnormal state of a first active element supporting delivery of a signal of a first frequency band among the at least some of the plurality of active elements being detected, controlling the portable communication device to change a communication path associated with the first active element to a communication path associated with a second active element different from the first active element among the plurality of active elements to deliver the signal of the first frequency band.

According to various example embodiments, a portable communication device is provided. The portable communication device may include: a communication processor, at least one antenna, and a communication circuit disposed between the communication processor and the at least one antenna to support a plurality of radio frequency transmit paths and a plurality of radio frequency receive paths and configured to respectively or selectively support a plurality of radio frequency bands. The communication processor may be configured to: determine whether a first transmit path is abnormal based on signal quality of the first transmit path for transmitting a first radio frequency signal among the plurality of radio frequency transmit paths and may control the communication device to change a path to output the first radio frequency signal through a second transmit path different from the first transmit path, based on an abnormality occurring in the first transmit path.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a diagram illustrating an example state value of an active element according to various embodiments;

FIG. 8 is a diagram illustrating an example of a block Rx path setting table according to various embodiments;

FIG. 9 is a diagram illustrating an example of an uplink carrier aggregation (ULCA) combo list according to various embodiments;

FIG. 11 is a diagram illustrating an example of combo recombination according to various embodiments;

FIG. 14 is a diagram illustrating example operating of a portable communication device associated with setting a bypass communication path according to various embodiments;

With regard to description of drawings, the same or similar denotations may be used for the same or similar components.

DETAILED DESCRIPTION

Hereinafter, the disclosure illustrates example configurations and methods of a communication path for a portable communication device to provide a new bypass communication path which bypasses a communication path including hardware parts in which an abnormality occurs, when the abnormality occurs in the at least some hardware parts including some of a plurality of communication paths in a process of performing communication using a portable communication device, to ensure or improve communication performance and a portable communication device supporting the same. In addition, the disclosure may provide embodiments about limited operation of a bypass communication path and an embodiment associated with configuring other communication paths.

As an example, the disclosure may provide a method for performing smooth radio frequency (RF) communication even when a problem occurs in an RF path in long term evolution (LTE) and 5 generation (5G) communication and a portable communication device supporting the same. In this regard, the portable communication device of the disclosure may recognize occurrence of problems of some of the plurality of communication paths to block the communication path in which the problem occurs not to use the communication path and may provide an alternate path (or a bypass communication path) which is not in used, thus providing a consumer with stable RF communication.

Figure 1:
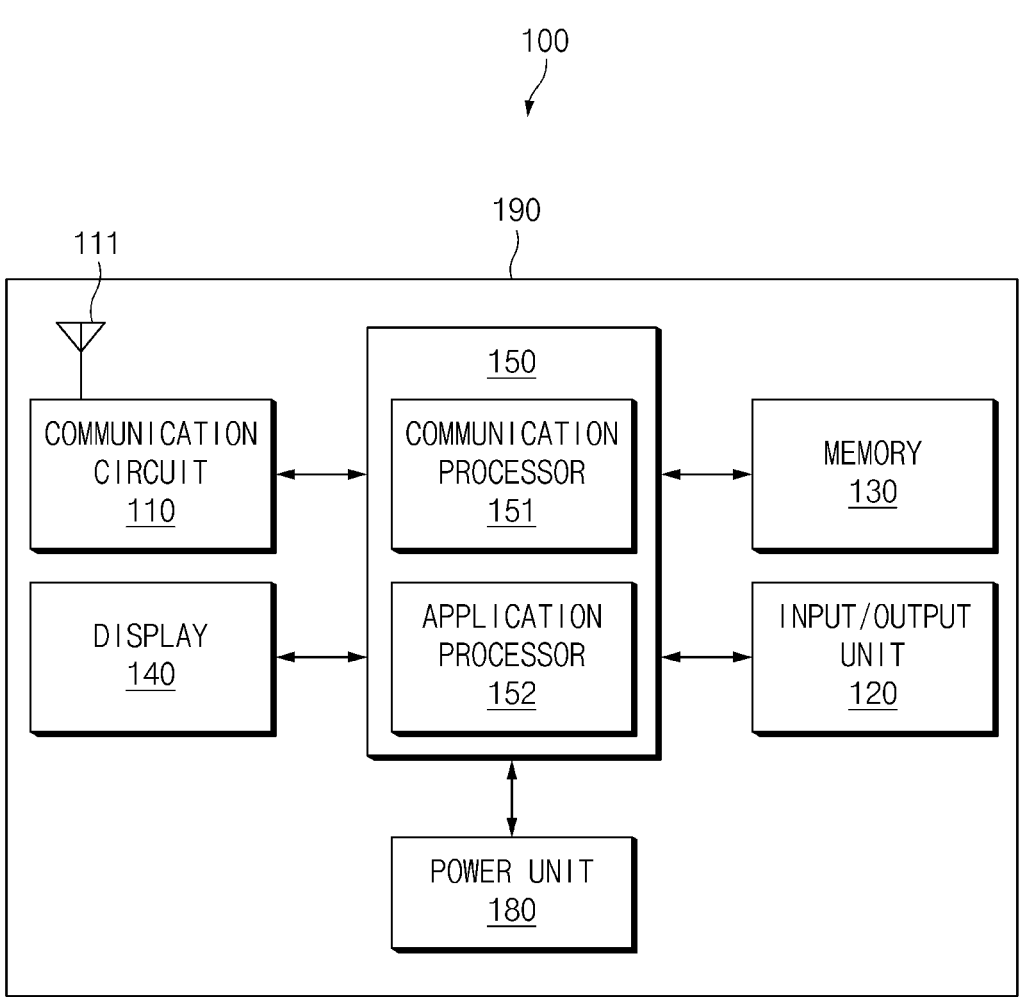
FIG. 1 is a block diagram illustrating an example configuration of a portable communication device according to various embodiments.

FIG. 1 is a block diagram illustrating an example configuration of a portable communication device 100 according to various embodiments.

Referring to FIG. 1, the portable communication device 100 may include at least one antenna 111, a communication circuit 110, an input/output unit (e.g., including input/output circuitry) 120, a memory 130, a display 140, at least one processor (e.g., including processing circuitry) 150, a power unit (e.g., including power supply circuitry) 180, and/or a housing 190.

The housing 190 may form at least a part of the appearance of the portable communication device 100. The at least a part of the housing 190 may include the at least one antenna 111. In this regard, the at least a part of the housing 190 may include a metallic material. As an example, the housing 190 may include a plurality of gaps and may be divided into a plurality of parts through the plurality of gaps. At least some of the plurality of parts may be used as the at least one antenna 111. The at least some of the plurality of parts of the housing 190 may be configured to receive or transmit signals of different frequency bands. The at least some of the plurality of parts of the housing 190 may be configured to receive or transmit signals of the same frequency band.

As an example, the housing 190 may be formed such that an area of its front and rear surface is larger than an area of a side surface, and at least a part of the display 140 may be disposed in the front surface. A non-metallic cover or a cover, at least a part of which is formed of metal, may be disposed in the rear surface of the housing 190. As one of various examples, the housing 190 may include a mid plate disposed on a central part such that the display 140 is located on the front surface and the cover is located on the rear surface and a side part disposed perpendicular to the bottom of the central part of the mid plate. The housing 190 may include a cover which forms the rear surface and a side part disposed perpendicular to the bottom of the central part of the cover. At least a part of the side surface of the housing 190 or at least a part of the cover disposed on the rear surface may include the at least one antenna 111. At least a part of the mid plate disposed on the central part of the housing 190 or at least a part of the cover may be used as a ground part during operation of the communication circuit 110. In the disclosure, the communication circuit 110 may be configured to cover a plurality of frequency bands. In this case, at least some of the plurality of parts of the housing 190 may be electrically connected with the communication circuit 110 to transmit and receive a signal of at least one frequency band of the communication circuit 110.

The portable communication device 100 of the disclosure may include at least one antenna (or an antenna pattern) independently provided on the housing 190 in conjunction with supporting a communication function of the communication circuit 110. As an example, the portable communication device 100 may further at least one carrier (or a non-metallic structure) on which the at least one antenna is mounted or at least one carrier (or a non-metallic structure) in which at least one antenna pattern is patterned.

The power unit 180 may include various circuitry and supply power associated with operating a function of the portable communication device 100. As an example, the power unit 180 may be provided in a secondary battery type. The power unit 180 may store power through a charging operation and may supply power necessary for operation of the portable communication device 100 through a discharging operation. According to an embodiment, the power unit 180 may supply power associated with operation of the communication circuit 110. For example, the power unit 180 may supply power to the communication circuit 110 to generate a signal for transmitting to a base station or to recover a signal received from the base station. As an example, the power unit 180 may supply power necessary for operation of the plurality of communication paths where the signal is transmitted or received based on hardware parts included in the communication circuit 110 in response to control of a communication processor 151 in the at least one processor 150.

The at least one antenna 111 may support a signal transmission and reception function of the communication circuit 110. The at least one antenna 111 may be at least one or plural in number according to a frequency band supported by the communication circuit 110. As an example, as described above, the at least one antenna 111 may include at least a part of the housing 190 provided with a metallic material. The at least one antenna 111 may include at least one antenna pattern provided separately from (or independently of) the housing 190. As an example, the at least one antenna 111 may include a plurality of antennas for supporting an LTE communication scheme and a plurality of antennas for supporting a 5G communication scheme.

The communication circuit 110 may support a communication function of the portable communication device 100. In this regard, the communication circuit 110 may establish a communication channel with a base station and may transmit and receive a specified signal with the base station in response to a predetermined communication protocol. As an example, the communication circuit 110 may establish a communication channel with an Internet network through the base station and may communicate with a specified server device. As an example, the communication circuit 110 may establish a communication channel with the base station by means of various communication schemes. For example, the communication circuit 110 may establish a communication channel with the base station by means of the LTE communication scheme. In this regard, the communication circuit 110 may include an LTE communication chip (or transceiver). The communication circuit 110 may establish a communication channel with the base station by means of the 5G communication scheme. In this regard, the communication circuit 110 may include a 5G communication chip (or transceiver). As an example, the communication circuit 110 may include various components required in communicating with the base station, for example, at least one switch connected with the at least one antenna 111, at least one signal transmission and reception module connected with the at least one switch, at least one transceiver connected with the at least one signal transmission and reception module, and a multi input multi output (MIMO) module. At least a part of such a communication circuit 110 may be disposed on a printed circuit board. As an example, the communication circuit 110 may transmit and receive a signal of one frequency band through one antenna or may transmit and receive signals of a plurality of frequency bands through one antenna. Alternatively, the communication circuit 110 may transmit and receive the signals of the plurality of frequency bands through a plurality of antennas. Alternatively, the communication circuit 110 may transmit and receive the signal of the one frequency band through the plurality of antennas. The above-mentioned communication circuit 110 may include at least one hardware part disposed between the communication processor 151 and the at least one antenna 111.

The input/output unit 120 may include various input/output circuitry including, for example, at least one of an input means for supporting an input function of the portable communication device 100 and an output means for supporting an output function of the portable communication device 100. According to one example, the input/output unit 120 may generate and deliver a user input for requesting to activate or deactivate a communication function of the portable communication device 100 and a user input for requesting to access the server device or requesting to disconnect from the accessed server device over a specific communication network to the at least one processor 150 depending on a user manipulation. According to an embodiment, the input/output unit 120 may output at least one audio signal, light, or vibration associated with operation of the communication circuit 110. According to an embodiment, the input means in the input/output unit 120 may include at least one of a physical key, a touch key, a touch pad, and a soft key (a software key provided based on a touch screen on the display 140), which generate a user input. As another example, the output means in the input/output unit 120 may include at least one of a speaker capable of outputting an audio signal, an LED lamp capable of outputting a light of a specific color, and a vibration module capable of outputting vibration.

The memory 130 may store at least one application associated with operation of the portable communication device 100 or data associated with operation of the application. As an example, the memory 130 may store a protocol or a communication application associated with establishment of at least one communication channel, which is performed through the communication circuit 110. The memory 130 of the disclosure may store matching information with respective hardware parts included in the communication circuit 110 and hardware parts for supporting at least one frequency band. The memory 130 may store information of a hardware part in which an abnormality occurs, and information of a communication path bypassed according to the hardware part in which the abnormality occurs. As an example, the memory 130 may store CA combination information defined to use a CA technology (e.g., information of frequency bands used for CA) for a specific communication scheme of a specific communication service provider. The memory 130 may store information such as MIMO operation information for each CA combination, a frequency band, a frequency operation scheme, a throughput, and/or a throughput delta.

The display 140 may output at least one screen associated with operation of the portable communication device 100. For example, the display 140 may output a screen (or an object) indicating a state where a communication channel is established with an external electronic device (or a server device or an external communication network) according to operation of the communication circuit 110 or a screen (or an object) corresponding to data received from the external electronic device in response to control of the at least one processor 150. According to an embodiment, the display 140 may output at least one of an indicator (e.g., an indication icon or image or an indication text) indicating occurrence of an abnormality in at least one hardware part included in the communication circuit 110, an indicator indicating a communication path including the hardware part in which the abnormality occurs, and an indicator indicating a bypass communication path for replacing the communication path in which the abnormality occurs and whether to operate the bypass communication path. As another example, the display 140 may output at least one of information indicating that it is unable to support specified CA performance due to a failure in a hardware part of the communication circuit 110, information for requesting a repair to use specified CA performance, and contact information (e.g., link information or map information) for a repair of the communication circuit 110.

The at least one processor 150 may include various processing circuitry and control to deliver and process or store a signal associated with operating a function of the portable communication device 100. In this regard, the portable communication device 100 may include the communication processor (e.g., including processing circuitry) 151 and an application processor (e.g., including processing circuitry) 152. The application processor 152 may control the display 140 and control the input/output unit 120. The communication processor 151 may control the device 100 to establish a communication path of the communication circuit 110 associated with operating a communication function of the portable communication device 100. As an example, the communication processor 151 may control at least one switch element included in the communication circuit 110, an element including a switching function, a MUX, a duplex, or a tuner and may control to establish a communication path capable of transmitting and receiving a signal of a specific frequency band. According to an embodiment, the communication processor 151 may select a bypass communication path with relatively low power consumption, in the process of closing a communication path in which an abnormality occurs among the plurality of communication paths and determining the bypass communication path.

As described above, when an abnormality occurs in some of the plurality of communication paths provided by the communication circuit including various hardware parts, the portable communication device 100 of the disclosure may provide a bypass communication path for replacing the some of the plurality of communication paths, in which the abnormality occurs, thus stably providing communication performance (e.g., CA performance or an emergency communication function).

Figure 2:
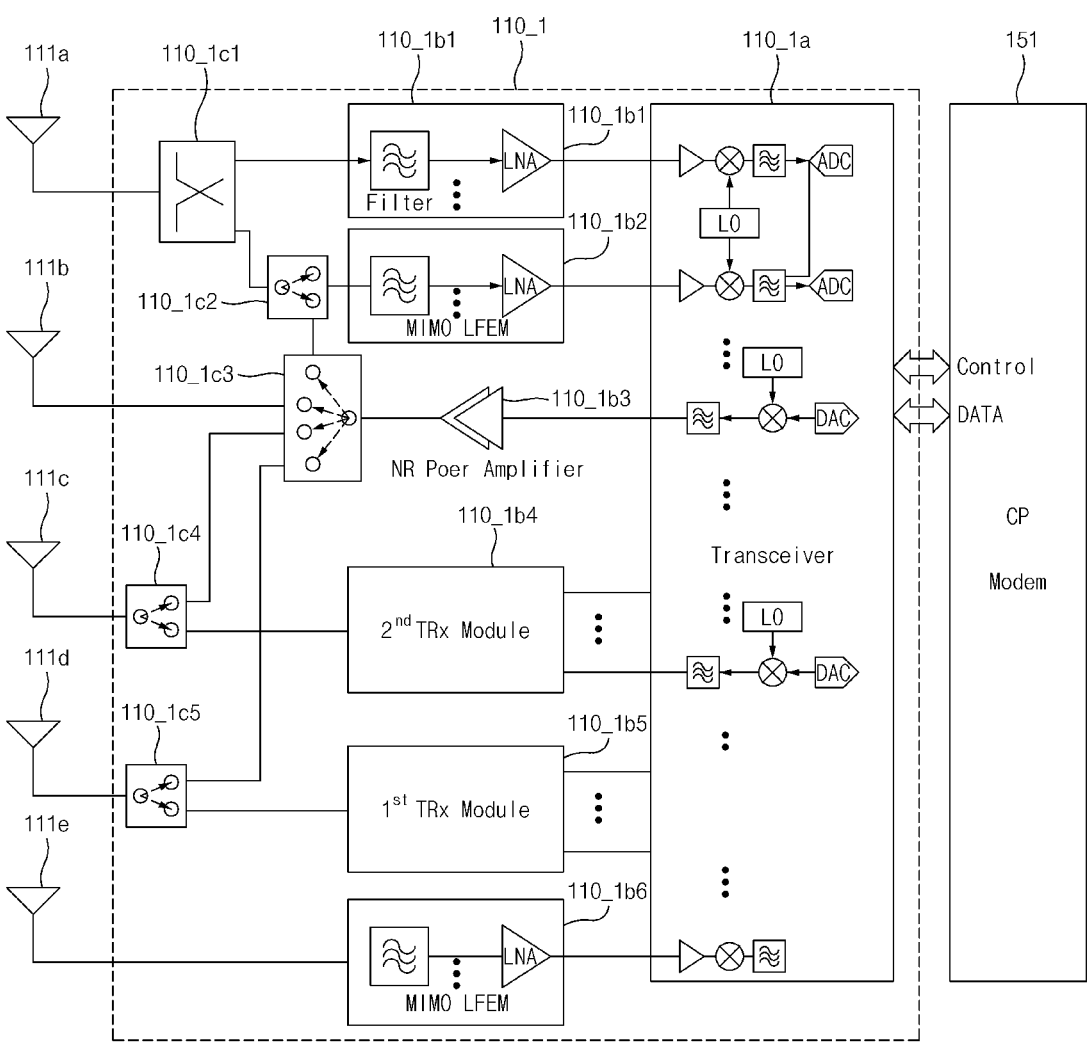
FIG. 2 is a diagram illustrating example components of a portable communication device associated with operating a communication function according to various embodiments.

FIG. 2 is a diagram illustrating example components of a portable communication device associated with operating a communication function according to various embodiments. FIG. 3 is a diagram illustrating an example state value of an active element according to various embodiments.

Referring to FIG. 2, at least some components of a portable communication device 100 according to an embodiment may include a communication processor (e.g., including processing circuitry) 151, a plurality of antennas 111a, 111b, 111c, 111d, and 111e, and a communication circuit 110_1.

The communication processor 151 may support the same or similar function to the communication processor 151 described above in FIG. 1. As an example, the communication processor 151 may control at least one component, for example, an RFIC, a radio frequency-front-end (RFFE), or an average power tracking, envelope tracking (APT (ET)) modulator and may process an antenna S/W code and/or a tune code. The communication processor 151 may deliver a control signal and data to at least some components of the communication circuit 110_1 and may receive data from the communication circuit 110_1.

The communication circuit 110_1 may include, for example, a transceiver 110_1a, a diversity receiver (DRx) LNA front end module (LFEM) 110_1b1, a first multi-input multi-output (MIMO) LFEM 110_1b2, a new ratio (NR) power amplifier 110_1b3, a first tx and rx (TRx) module 110_1b5, a second TRx module 110_1b4, a second MIMO LFEM 110_1b6, first to fourth switches 110_1c2, 110_1c3, 110_1c4, and 110_1c5, and/or a diplexer 110_1c1 (or a triplexer).

The transceiver 110_1a may include, for example, at least one amplifier, at least one multiplier, at least one analog to digital converter (ADC), and/or at least one digital to analog converter (DAC) connected with at least some of the DRx LFEM 110_1b1, the first MIMO LFEM 110_1b2, the NR power amplifier 110_1b3, the first TRx module 110_1b5, a second TRx module 110_1b4, and the second MIMO LFEM 110_1b6. Furthermore, the transceiver 110_1a may include at least one filter. The transceiver 110_1a may mix and process a signal of the communication processor 151 (or the modem) with a radio frequency signal and may control an RFFE part. According to an embodiment, the transceiver 110_1a may generate and deliver at least one signal to be transmitted in response to control of the communication processor 151 to at least one of the NR power amplifier 110_1b3, the first TRx module 110_1b5, and the second TRx module 110_1b4. Alternatively, the transceiver 110_1a may receive a signal from the DRx LFEM 110_1b1, the first MIMO LFEM 110_1b2, the second MIMO LFEM 110_1b6, the first TRx module 110_1b5, and/or the second TRx module 110_1b4.

The DRx LFEM 110_1b1 may process a DRx signal received from the antenna. In this regard, the DRx LFEM 110_1b1 may include a plurality of filters and a plurality of amplifiers (e.g., low noise amplifiers) and may receive and deliver a signal corresponding to a plurality of frequency bands to the transceiver 110_1a. In this regard, the DRx LFEM 110_1b1 may be disposed between the transceiver 110_1a and the diplexer 110_1c1.

The first MIMO LFEM 110_1b2 may include more filters and amplifiers than the DRx LFEM 110_1b1, may receive a signal of various frequency bands (e.g., more frequency bands than the number of frequency bands capable of being received by the DRx LFEM 110_1b1), and may deliver the received signal to the transceiver 110_1a. Such a first MIMO LFEM 110_1b2 may be disposed between the first switch 110_1c2 and the transceiver 110_1a. The second MIMO LFEM 110_1b6 may be a receive module which supports the same performance as the first MIMO LFEM 110_1b2. Alternatively, the second MIMO LFEM 110_1b6 may be provided to process a signal of more (or less) frequency bands than the first MIMO LFEM 110_1b2. The first MIMO LFEM 110_1b2 and the second MIMO LFEM 110_1b6 may process a MIMO Rx signal received from the antenna.

The NR power amplifier 110_1b3 may receive, amplify, and deliver a signal associated with 5G communication from the transceiver 110_1a to the second switch 110_1c3. The first TRx module 110_1b5 may be disposed between the fourth switch 110_1c5 and the transceiver 110_1a and may perform a transmit circuit function and a receive circuit function in response to control of the communication processor 151. The second TRx module 110_1b4 may be disposed between the third switch 110_1c4 and the transceiver 110_1a and may perform a transmit circuit function and a receive circuit function in response to control of the communication processor 151. In this regard, the first TRx module 110_1b5 or the second TRx module 110_1b4, which is described above, may include a part for amplifying a transmitter (Tx) of a radio frequency signal and a part (including an LNA) for processing a receiver (Rx) signal received from the antenna. According to an embodiment, the second TRx module 110_1b4 may be an eutran new radio (NR) dual connectivity (ENDC) module and may include a device for a second TX output for LTE or ENDC. The diplexer 110_1c1 may be disposed between the first antenna 111a and the DRx LFEM 110_1b1 and between the first antenna 111a and the first switch 110_1c2 and may switch the received signal.

The first switch 110_1c2 may be disposed between the diplexer 110_1c1 and the first MIMO LFEM 110_1b2, and the second switch 110_1c3 may be disposed between the second antenna 111b and the NR power amplifier 110_1b3. According to an embodiment, a first point of the second switch 110_1c3 may be connected with the first switch 110_1c2, a second point of the second switch 110_1c3 may be connected with the second antenna 111b, a third point of the second switch 110_1c3 may be connected with the third switch 110_1c4, and a fourth point of the second switch 110_1c3 may be connected with the fourth switch 110_1c5.

The third switch 110_1c4 may be connected between the third antenna 111c and the second TRx module 110_1b4. According to an embodiment, an input point of the third switch 110_1c4 may be fixed to the third antenna 111c, a first point of an output terminal of the third switch 110_1c4 may be connected with the second switch 110_1c3, and a second point of the output terminal of the third switch 110_1c4 may be connected with the second TRx module 110_1b4.

The fourth switch 110_1c5 may be disposed between the fourth antenna 111d and the first TRx module 110_1b5. According to an embodiment, an input point of the fourth switch 110_1c5 may be fixed to the fourth antenna 111d, a first point of an output terminal of the fourth switch 110_1c5 may be connected with the second switch 110_1c3, and a second point of the output terminal of the fourth switch 110_1c5 may be connected with the first TRx module 110_1b5.

The plurality of antennas 111a, 111b, 111c, 111d, and 111e may include, for example, the first antenna 111a connected with a diplexer 110_1c1 included (or disposed) in the communication circuit 110_1, the second antenna 111b connected with the second switch 110_1c3 of the communication circuit 110_1, the third antenna 111c connected with the third switch 110_1c4 of the communication circuit 110_1, the fourth antenna 111d connected with the fourth switch 110_1c5 of the communication circuit 110_1, and the fifth antenna 111e connected with the second MIMO LFEM 110_1b6. At least some of the plurality of antennas 111a, 111b, 111c, 111d, and 111e may be formed as a housing 190 of the portable communication device 100 described above in FIG. 1 or a metallic structure or pattern provided separately from the housing 190.

At least some of the portable communication device 100 according to the above-mentioned embodiment are illustrated as an example. The plurality of antennas 111a, 111b, 111c, 111d, and 111e and the components of the communication circuit 110_1 among the at least some of the portable communication device 100 may vary with at least one of the number of communication service providers for the purpose of the portable communication device 100, a magnitude of a frequency band operated by each communication service provider, and the number of frequency bands.

When an abnormality occurs in at least a part of the communication circuit 110_1, the communication processor 151 of the portable communication device 100 of the disclosure may determine and operate a bypass communication path capable of replacing a communication path including a hardware part in which the abnormality occurs. For example, when an abnormality occurs in a receive circuit part of the first TRx module 110_1b5, the communication processor 151 may replace a communication path (or a first communication path) including the receive circuit part of the first TRx module 110_1b5 with a bypass communication path (or a second communication path) including a receive circuit part of the second TRx module 110_1b4. Alternatively, when an abnormality occurs in at least a part of the first MIMO LFEM 110_1b2, the communication processor 151 may replace a communication path including the first MIMO LFEM 110_1b2 with a bypass communication path including the second MIMO LFEM 110_1b6. According to an embodiment, when an abnormality occurs in at least a part of the DRx LFEM 110_1b1, the communication processor 151 may replace a communication path including the DRx LFEM 110_1b1 with a bypass communication path including at least one of the first MIMO LFEM 110_1b2 or the second MIMO LFEM 110_1b6.

An element capable of delivering its state value to the communication processor 151 (or the transceiver 110_1a) among the components included in the communication circuit 110_1 in the portable communication device 100 of the disclosure described above may be classified as an active element, and an element incapable of delivering its state value may be classified as a passive element. The active element may transmit and receive a signal with, for example, the communication processor 151 through a mobile industry processor interface (MIPI). The communication processor 151 may collect information about whether the part for the active element is defective using the MIPI. According to an embodiment, information indicating its state may be received from at least one of the transceiver 110_1a, the DRx LFEM 110_1b1, the first MIMO LFEM 110_1b2, the NR power amplifier 110_1b3, the first TRx module 110_1b5, the second TRx module 110_1b4, the second MIMO LFEM 110_1b6, and the diplexer 110_1c1.

Referring to FIG. 3, as described, the communication processor 151 may receive signals indicating their state values from the active elements and may identify whether an abnormality occurs in an active element which receives a state value (e.g., NG(2)) according to occurrence of an abnormality among them. According to an embodiment, the communication processor 151 may identify a process identification (PID) from the received information to identify whether an abnormality occurs in any hardware part. Referring to the shown contents, the communication processor 151 may identify a part associated with the upper DRx LFEM 110_1b1 is defective by identifying the PID.

Figure 4:
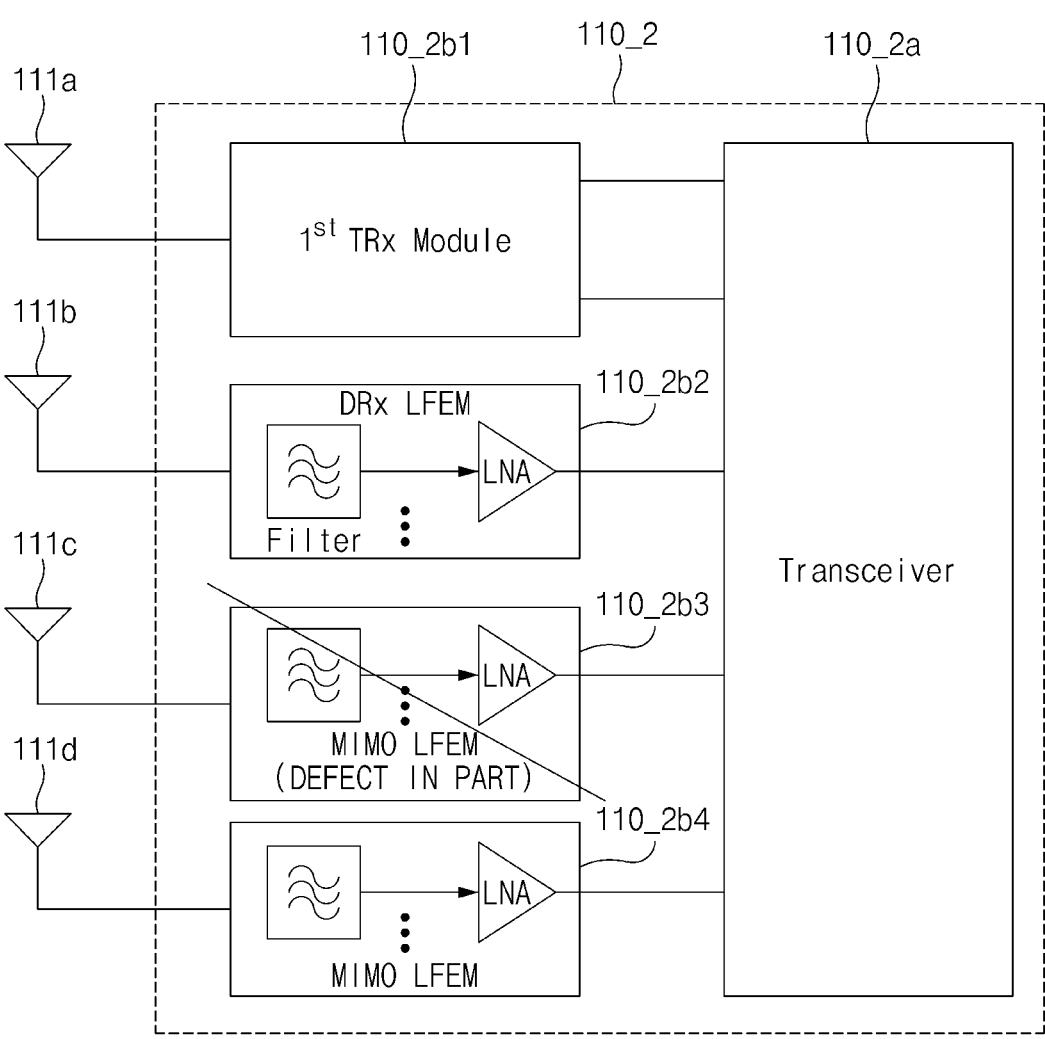
FIG. 4 is a diagram illustrating example components of a communication circuit and antennas among components of a portable communication device associated with operating a communication function according to various embodiments.
Figure 5:
FIG. 5 is a diagram illustrating an example of updating information associated with setting a bypass communication path of a portable communication device according to various embodiments.

FIG. 4 is a diagram illustrating example components of a communication circuit and antennas among components of a portable communication device associated with operating a communication function according to various embodiments. FIG. 5 is a diagram illustrating an example of updating information associated with setting a bypass communication path of a portable communication device according to various embodiments.

Referring to FIG. 4, a portable communication device 100 according to an embodiment of the disclosure may at least include a communication circuit 110_2 and a plurality of antennas 111a, 111b, 111c, and 111d. In addition, as described above in FIG. 2, the portable communication device 100 may further include a communication processor which controls operation of the communication circuit 110_2.

The plurality of antennas 111a, 111b, 111c, and 111d may include, for example, first to fourth antennas. The first antenna 111a may be connected with a first TRx module 110_2b1 of the communication circuit 110_2. The second antenna 111b may be connected with a DRx LFEM 110_2b2 of the communication circuit 110_2. The third antenna 111c may be connected with a first MIMO LFEM 110_2b3 of the communication circuit 110_2. The fourth antenna 111*d* may be connected with a second MIMO LFEM 110_2*b*4 of the communication circuit 110_2.

The communication circuit 110_2 may include the transceiver 110_2*a*, the first TRx module 110_2*b*1, the DRx LFEM 110_2*b*2, the first MIMO LFEM 110_2*b*3, and the second MIMO LFEM 110_2*b*4. The components of the transceiver 110_2*a*, the first TRx module 110_2*b*1, the DRx LFEM 110_2*b*2, the first MIMO LFEM 110_2*b*3, and the second MIMO LFEM 110_2*b*4 may support the same or similar functions to the respective components described above in FIG. 2. As described above, the components of the communication circuit 110_2 may vary with at least one of the number of communication service providers supported by the portable communication device 100, at least one communication service provider frequency band, and the number of frequency bands.

A defect may occur in a part of the first MIMO LFEM 110_2*b*3 in the portable communication device 100, having the above-mentioned structure. In response, the communication processor 151 of the portable communication device 100 may reduce an order of the first MIMO LFEM 110_2*b*3 in which the defect occurs to limit performance and may set a bypass replacement path.

For example, as shown in FIG. 5, the portable communication device 100 including the communication circuit of FIG. 4 may control to update at least some of CA combo items included in the CA combo table and use the second MIMO LFEM 110_2*b*4. In conjunction with the items listed in the CA combo table, B1 may refer to Band 1 corresponding to a predefined (e.g., specified) frequency band, and "A" in B1A may refer to downlink and may refer, for example, to the number of resource blocks being less than or equal to 100 with respect to an LTE downlink bandwidth class. "[4]" in B1A[4] may refer to 4×4 MIMO, and A[1] may refer to an uplink 1 channel (single input single output (SISO)). In conjunction with updating the CA combo item, when a defect occurs in MIMO used by B1A[4], the CA combo table may include information in which a B1A[4];A[1]+ B3A[4] Ca combo item is updated to a B1A[2];A[1]+B3A [2] CA combo item. Similarly, the update of the CA combo table may include a combo item where B1A[4];A[1]+B7A [4] is updated to B1A[2];A[1]+B7A[2] and combo items where B7A[4];A[1]+B7A[4] is updated to B7A[2];A[1]+ B7A[2].

Referring to FIG. 5, it may be identified that it is set to use the second MIMO LFEM 110_2*b*4 as the defect occurs in the first MIMO LFEM 110_2*b*3. In the shown drawing, numbers in parentheses may refer to order values of MIMO, respectively. For example, number 4 may refer to using MIMO as 4×4 (e.g., 4 inputs and 4 outputs), number 2 may refer to using MIMO as 2×2 (e.g., 2 inputs and 2 outputs), and number 1 may refer to using MIMO as 1×1 (e.g., 1 input and 1 output). To support such operations, the communication processor 151 may change the number of Rx support layers of each frequency band in software and may update at least some of CA combo items included in the CA combo table in response to a change in MIMO Rx order. In conjunction with updating the CA combo table, the communication processor 151 may transmit information (e.g., user equipment (UE) capability information) including the corresponding update information as a radio resource control (RCC) message to a base station.

Figure 6:
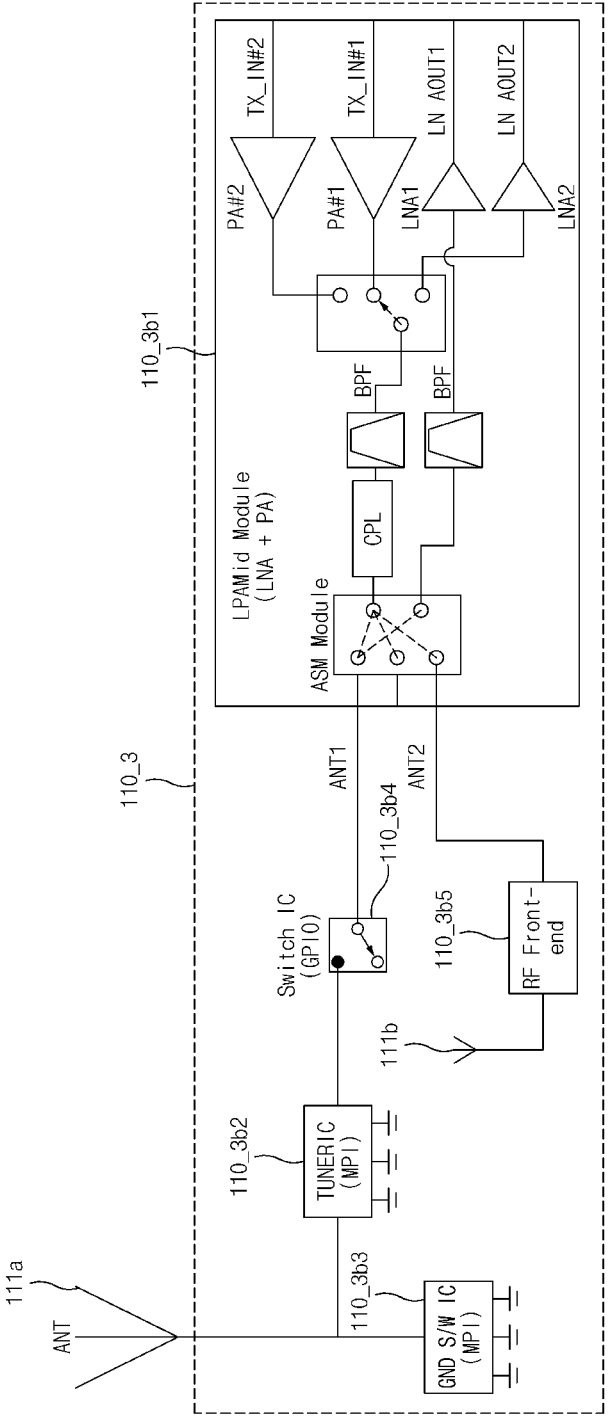
FIG. 6 is a diagram illustrating a part of a portable communication device structure for describing a setting of a bypass communication path according to various embodiments.

FIG. 6 is a diagram illustrating a part of a portable communication device structure for describing a setting of a bypass communication path according to various embodiments.

Referring to FIG. 6, a portable communication device 100 according to an embodiment may include a first antenna 111*a*, a second antenna 111*b*, and at least a part of a communication circuit 110_3. The components of the communication circuit shown in FIG. 6 may correspond to a first MIMO LFEM 110_2*b*3 in which a defect occurs, which is described above in FIG. 4.

The communication circuit 110_3 may include, for example, an LPA module 110_3*b*1 (e.g., a low noise amplifier (LNA)+a power amplifier (PA)), a GND switch IC 110_3*b*3, a tuner IC 110_3*b*2, a switch IC 110_3*b*4, and/or an RFFE 110_3*b*5. The LPA module 110_3*b*1 may include two amplifiers (e.g., PA #1 and PA #2) capable of amplifying a transmit signal, two amplifiers LNA1 and LNA2 capable of amplifying a receive signal, an antenna switching module (ASM) module capable of switching a connection state of the first antenna 111*a* and the second antenna 111*b*, two band pass filters BPFs, and a switch module for switching one of the band pass filters, the transmit amplifiers PA #1 and PA #2, and the one receive amplifier LNA 1.

The GND switch IC 110_3*b*3 may be disposed between the first antenna 111*a* and a ground and may selectively control the ground of the first antenna 111*a*. The GND switch IC 110_3*b*3 may deliver state information to a communication processor 151 through an MIPI.

The tuner IC 110_3*b*2 may support a frequency tuning function of the first antenna 111*a*. The tuner IC 110_3*b*2 may deliver state information to the communication processor 151 through the MIPI. The tuner IC 110_3*b*2 may be disposed between the first antenna 111*a* and the switch IC 110_3*b*4.

The switch IC 110_3*b*4 may be disposed between the tuner IC 110_3*b*2 and the LPA module 110_3*b*1. The switch IC 110_3*b*4 may be controlled through a GPIO which belongs to the communication processor 151. The switch IC 110_3*b*4 may be a passive element, which may fail to provide separate state information.

The RFFE 110_3*b*5 may be disposed between the second antenna 111*b* and a second antenna port of the LPA module 110_3*b*1. The RFFE 110_3*b*5 may be an RF front-end module of the first antenna 111*a*, which may include at least some elements of the communication circuit 110_3 described above in FIG. 2.

The communication processor 151 of the portable communication device 100 having the above-mentioned structure may set a GPIO of a communication path with a defective part to operate with low logic for (e.g., block a GPIO of the switch IC 110_3*b*4), depending on the update of the CA combo table described above in FIG. 5 and may set a MIPI part (e.g., the GND switch IC 110_3*b*3, the tuner IC 110_3*b*2, or the LPA module 110_3*b*1) to turn off a sleep mode or power.

According to an embodiment, upon an operation of a frequency band sharing a defective communication path (e.g., a path where a part in which an abnormality occurs in hardware is present on a signal transmission and reception path), the communication processor 151 may add a setting for operating the defective communication path in an isolation mode. For example, the communication processor 151 may control to use a communication path passing through the first antenna 111*a* upon an operation of B1 frequency band in an ant switch module (ASM) in the LPA module 110_3*b*1 and may set to use a communication path passing through the second antenna 111*b* upon an operation of B7 frequency band. According to an embodiment, when performing a signal transmission and reception operation of B7 frequency band, in a situation where a defect is present on the communication path of B1 frequency band, the communication processor 151 may set a first antenna port ANT1 of the ASM in the LPA module to operate in the isolation mode.

Figure 7:
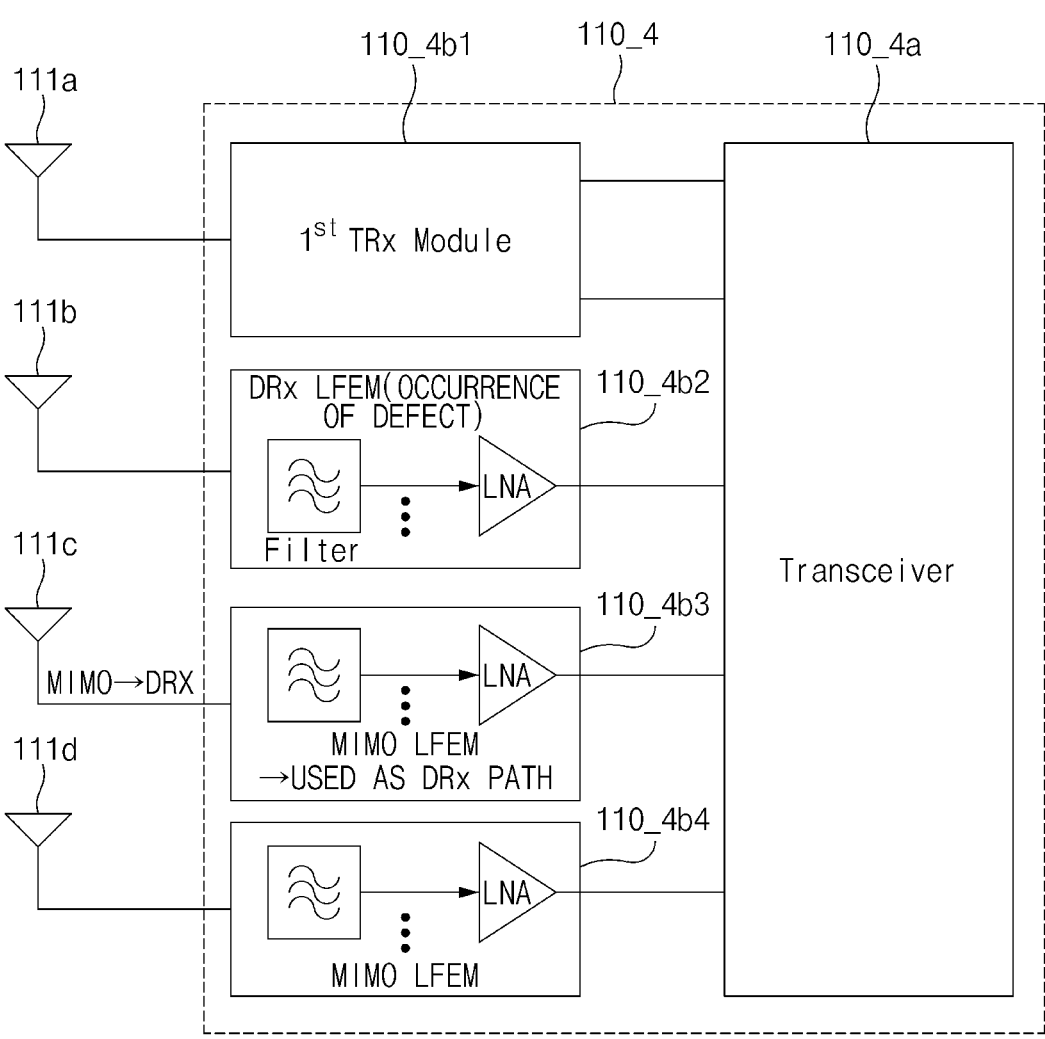
FIG. 7 is a diagram illustrating a part of a portable communication device structure for describing a setting of a DRx-related bypass communication path according to various embodiments.

FIG. 7 is a diagram illustrating a part of a portable communication device structure for describing a setting of a DRx-related bypass communication path according to various embodiments. FIG. 8 is a diagram illustrating an example of a block Rx path setting table according to various embodiments. FIG. 9 is a diagram illustrating an example of an uplink carrier aggregation (ULCA) combo list according to various embodiments.

Referring to FIG. 7, a portable communication device 100 according to an embodiment may include first to fourth antennas 111a, 111b, 111c, and 111d and at least a part of a communication circuit 110_4. Such components of the communication circuit 110_4 shown in FIG. 7 may further include at least some of the components described above in FIGS. 2 to 6. Alternatively, at least some of the components of the communication circuit 110_4 shown in FIG. 7 may be omitted. For example, the communication circuit 110_4 may include only two of four components except for a transceiver 110_4a. In addition, the portable communication device 100 may further include a communication processor (e.g., a communication processor 151 of FIG. 2) which controls operation of the communication circuit 110_4.

The communication circuit 110_4 may include the transceiver 110_4a, a first TRx module 110_4b1, a DRx LFEM 110_4b2, a first MIMO LFEM 110_4b3, and a second MIMO LFEM 110_4b4. The transceiver 110_4a may be a component which performs the same or similar function to the transceiver described above in FIG. 2. According to an embodiment, the transceiver 110_4a may support signal transmission and reception of at least some of the first TRx module 110_4b1, the DRx LFEM 110_4b2, the first MIMO LFEM 110_4b3, and the second MIMO LFEM 110_4b4.

The first TRx module 110_4b1 may be a component corresponding to (or which is the same as or similar to) the first TRx module described above in FIG. 2. The DRx LFEM 110_4b2, the first MIMO LFEM 110_4b3, and the second MIMO LFEM 110_4b4 may include the same or similar components to the DRx LFEM, the first MIMO LFEM, and the second MIMO LFEM described above in FIG. 2.

The first antenna 111a among the plurality of antennas may be connected with the first TRx module 110_4b1. The second antenna 111b may be connected with, for example, the DRx LFEM 110_4b2. The third antenna 111c may be connected with, for example, the first MIMO LFEM 110_4b3. The fourth antenna 111d may be connected with, for example, the second MIMO LFEM 110_4b4. At least some of the components included in the communication circuit 110_4 may deliver their state information to the communication processor. For example, the DRx LFEM 110_4b2 may identify information about its defective state and may deliver it to the communication processor. Alternatively, the communication processor may transmit a predefined signal to the DRx LFEM 110_4b2 and may identify a signal returned by the DRx LFEM 110_4b2 to determine whether the DRx LFEM 110_4b2 is defective.

When it is determined that the DRx LFEM 110_4b2 is defective, the communication processor may stop using the DRx LFEM 110_4b2 and may determine a bypass communication path capable of replacing the DRx LFEM 110_4b2. For example, the communication processor may replace the DRx LFEM 110_4b2 with the first MIMO LFEM 110_4b3. Herein, the communication processor may be configured to adjust a MIMO order of the first MIMO LFEM 110_4b3 and perform a DRx module function. Signals received through the third antenna 111c may be received by the first MIMO LFEM 110_4b3. The first MIMO LFEM 110_4b3 may operate with the DRx LFEM function to receive a signal and the received signal may be delivered to the transceiver 110_4a. The communication processor 151 may control to block a path including the DRx LFEM 110_4b2 not to use it.

According to an embodiment, it is described that the DRx LFEM 110_4b2 is replaced with the first MIMO LFEM 110_4b3 in the above embodiment, but the disclosure is not limited thereto. For example, the DRx LFEM 110_4b2 may be replaced with the second MIMO LFEM 110_4b4. In addition, the communication processor 151 may perform a test for the DRx LFEM 110_4b2 in which a defect occurs and may identify that the DRx LFEM 110_4b2 is usable as a single input single output (SISO) circuit element. When the DRx LFEM 110_4b2 is usable as the SISO circuit element, the communication processor 151 may use the DRx LFEM 110_4b2 as the SISO to receive a signal of a specific frequency band.

According to an embodiment, when the defect occurs in the DRx LFEM 110_4b2, as shown in FIG. 8, the communication processor 151 may determine an Rx path capable of being replaced, depending on a priority table. Referring to FIG. 8, in conjunction with operating various frequency bands B2, B25, B66, B30, B41, and B48, the communication processor 151 may be configured to use the first MIMO LFEM (or DRx MIMO or MIMO disposed adjacent to a predefined DRx antenna) as a third Rx path and use the second MIMO LFEM (or DRx MIMO or MIMO disposed adjacent to a predefined DRx antenna) as a fourth Rx path, while selectively operating the DRx LFEM 110_4b2. In the process of selecting the bypass communication path, the communication processor 151 may select a part of a path where total isotropic sensitivity (TIS) is relatively good. Meanwhile, an America setting table is illustrated by way of non-limiting example in conjunction with setting a block Rx path in FIG. 8, but the disclosure is not limited thereto. For example, a setting table where a bypass communication path capable of being replaced when a defect occurs in a specific DRx LFEM is set may also be applied to a portable communication device which supports another country in a similar manner or the same manner.

According to an embodiment, when a DRx path used by B2 band is defective in a situation where downlink (DL) 4×4 is supported in B2 band, the communication processor 151 may change DL 4×4 to 2×2. In this regard, the communication processor 151 may block a DRx path in which a defect occurs and may select a path for replacing the blocked DRx path between PRx MIMO and DRx MIMO. Referring to contents shown in FIG. 8, the communication processor 151 may select the DRx MIMO with the better Rx TIS characteristic between the two paths of PRx MIMO and DRx MIMO as the DRx path and may set a bypass path. According to an embodiment, the communication processor 151 may block PRx MIMO which is not selected in operation of B2 band.

According to an embodiment, when a defect occurs in the first TRx module 110_4b1, the communication processor 151 may deactivate the corresponding communication path (e.g., a tx path including the first TRx module 110_4b1) and may block uplink carrier aggregation (ULCA) combo as shown in FIG. 9. According to an embodiment, when a defect occurs in LTE B7 2nd Tx, the communication processor 151 may block a combination where B7 is provided to the 2nd Tx. For example, the communication processor

151 may block a 5A-7A combination, a 1A-7A combination, or a 3A-7A combination, which is a combination including number 7. The remaining ULCA combinations except for the three combinations described above in FIG. 9 may be normally used.

Meanwhile, referring to FIG. 9, the combo block of ULCA provided by Korean mobile communication service subscribers is illustrated by way of non-limiting example while describing the deactivation of the transmit path including the first TRx module 110_4b1 and the combo block of ULCA, but the disclosure is not limited thereto. For example, the blocking of the ULCA combo block described in the disclosure may be applied to combo of ULCA provided by at least one communication service provider in various countries in the same manner.

Figure 10:
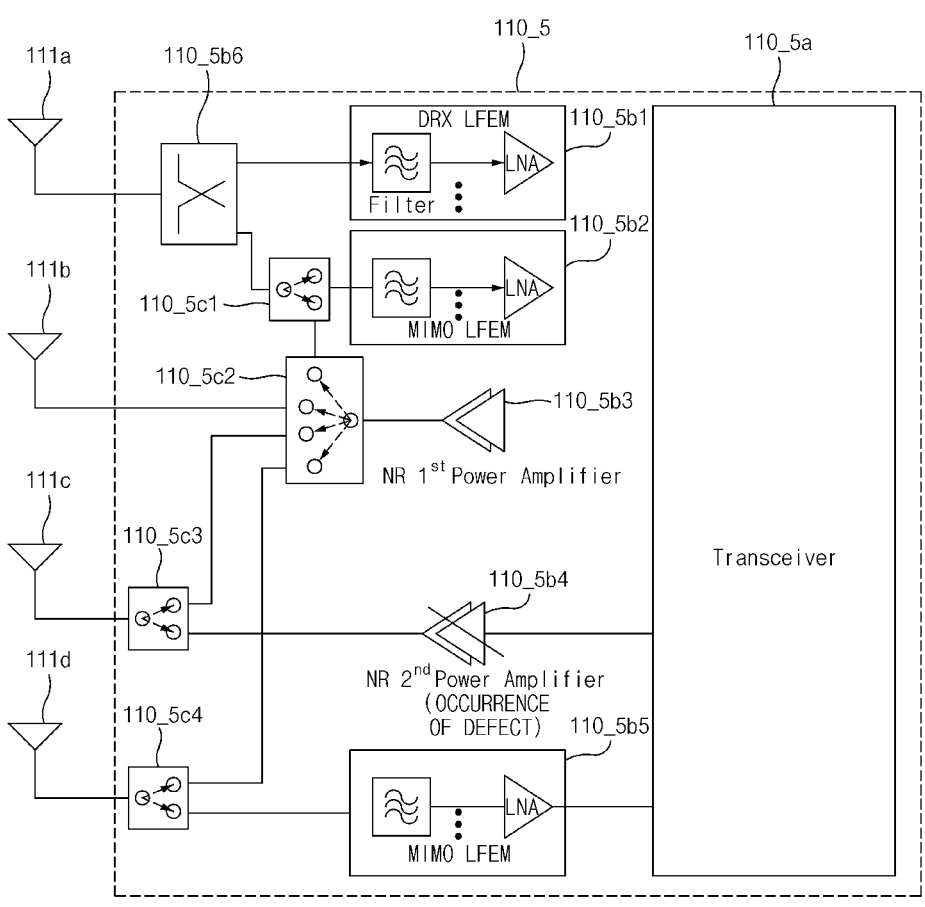
FIG. 10 is a diagram illustrating a part of a portable communication device structure for describing a setting of an NR Tx-related bypass communication path according to various embodiments.

FIG. 10 is a diagram illustrating a part of a portable communication device structure for describing a setting of an NR Tx-related bypass communication path according to various embodiments. FIG. 11 is a diagram illustrating an example of combo recombination according to various embodiments.

Referring to FIG. 10, a portable communication device 100 according to an embodiment may include first to fourth antennas 111a, 111b, 111c, and 111d and at least a part of a communication circuit 110_5. Such components of the communication circuit 110_5 shown in FIG. 10 may further include at least some of the components described above in FIGS. 2 to 7. Alternatively, at least some of the components of the communication circuit 110_5 shown in FIG. 10 may be omitted. For example, the communication circuit 110_5 may include only two of components except for a transceiver 110_5a. In addition, the portable communication device 100 may further include a communication processor (e.g., a communication processor 151 of FIG. 2) which controls operation of the communication circuit 110_5.

The communication circuit 110_5 may include the transceiver 110_5a, a DRx LFEM 110_5b1, a first MIMO LFEM 110_5b2, a second MIMO LFEM 110_5b5, a first NR power amplifier 110_5b3, a second NR power amplifier 110_5b4, and/or a diplexer 110_5b6. The transceiver 110_5a may be a component which performs the same or similar function to the transceiver described above in FIG. 2. According to an embodiment, the transceiver 110_5a may support signal transmission and reception of at least some of the DRx LFEM 110_5b1, the first MIMO LFEM 110_5b2, the second MIMO LFEM 110_5b5, the first NR power amplifier 110_5b3, the second NR power amplifier 110_5b4, and the diplexer 110_5b6.

The DRx LFEM 110_5b1, the first MIMO LFEM 110_5b2, the second MIMO LFEM 110_5b5, and the diplexer 110_5b6 may include the same or similar components to the DRx LFEM, the first MIMO LFEM, the second MIMO LFEM, and the diplexer described above in FIG. 2.

The first NR power amplifier 110_5b3 may be the same or similar component to the NR power amplifier 110_1b3 described above in FIG. 2. The second NR power amplifier 110_5b4 may be the same or similar component to the first NR power amplifier 110_5b3. The first NR power amplifier 110_5b3 and the second NR power amplifier 110_5b4 may be designed to amplify the NR signal delivered by the transceiver 110_5a and deliver the amplified signal to the second antenna 111b or the third antenna 111c.

The first antenna 111a among the plurality of antennas may be connected with the diplexer 110_5b6. The diplexer 110_5b6 may connected with the first MIMO LFEM 110_5b2 through the DRx LFEM 110_5b1 and a first switch 110_5c1. The second antenna 111b may be connected with a second switch 110_5c2, the third antenna 111c may be connected with a third switch 110_5c3, and the fourth antenna 111d may be connected with a fourth switch 110_5c4.

According to an embodiment, an input point of the first switch 110_5c1 may be connected with the diplexer 110_5b6, a first point in an output terminal of the first switch 110_5c1 may be connected with the first MIMO LFEM 110_5b2, and a second point in the output terminal of the first switch 110_5c1 may be connected with the second switch 110_5c2. The second switch 110_5c2 may include at least input point disposed close to a direction of the transceiver 110_5a (or an output terminal of the first NR power amplifier 110_5b3) and a plurality of output points. A first point among the plurality of output points of the second switch 110_5c2 may be connected with the first switch 110_5c1, a second point may be connected with the second antenna 111b, a third point may be connected with the output point of the third switch 110_5c3, and a fourth point may be connected with the output point of the fourth switch 110_5c4. An input point of the third switch 110_5c3 may be connected the third antenna 111c, a first point in an output terminal of the third switch 110_5c3 may be connected with the second switch 110_5c2, and a second point in the output terminal of the third switch 110_5c3 may be connected with the second NR power amplifier 110_5b4. An input point of the fourth switch 110_5c4 may be connected with the fourth switch 111d, a first point in an output terminal of the fourth switch 110_5c4 may be connected with the second switch 110_5c2, and a second point in the output terminal of the fourth switch 110_5c4 may be connected with the second MIMO LFEM 110_5b5.

When an abnormality occurs in the second NR power amplifier 110_5b4, during a process of operating an NR combo combination using two transmit power amplifiers (e.g., a combination such as N41A[100×4];A[100×2]+N28A [30×2], in which two bandwidths are added), as shown in FIG. 11, the portable communication device 100 having the above-mentioned structure may perform a combo recombination using only the first NR power amplifier 110_5b3 (e.g., N41 NR CA) (e.g., a combination of N41A[100×4];A[100× 1]+N28A[30×2]). Referring to FIG. 11, the communication processor 151 may deactivate N41 UL MIMO combo depending a defect in a part of the second NR power amplifier 110_5b4. The communication processor 151 may be configured to use N41 uplink standalone (UL SA).

In FIG. 11, N41 in N41A[100×4];A[100×2] may refer to a frequency band corresponding to 5G NR SUB6 Band N41, and A in N41A may refer to a CA bandwidth class in downlink. [100×4] may refer to supporting DL 4×4 MIMO up to 100 mega (M) bandwidths, and A[100×2] may be a Tx 5G CA bandwidth class, which may refer to supporting UL 2×2 MIMO up to 100 M bandwidths. In conjunction with an SRS (ANT SW) part, SRS may refer to supporting a sounding reference signal, and T2 may refer, for example, to Tx paths being two (when supporting 2×2 UL MIMO, because the Tx paths are two, it is written as T2, and for UL SISO without supporting UL MIMO, it is defined as T1). R4 may refer, for example, to how many Rx path quality are checked using SRS (R4 may refer, for example, to information about four Rx paths being checked and R2 may refer, for example, to information about two Rx paths being checked). As an example, SRS T2 R4 may refer, for example, to quality of fourth Rx paths is checked using two Tx paths in an environment supporting SRS, and SRS_1T4R may refer, for example, to the quality of fourth Rx paths being checked using one Tx path in an environment supporting SRS.

As another example, when the portable communication device 100 is configured to transmit an NR signal using a Tx path in the TRx module, when a defect occurs in a part of the second NR power amplifier 110_5b4, when including the TRx module as shown in FIG. 2 or 7, the communication processor 151 may be configured to use the Tx path in the TRx module. In this process, the communication processor 151 may block the second NR power amplifier 110_5b4 not to use the second NR power amplifier 110_5b4 depending on occurrence of the defect in the part of the second NR power amplifier 110_5b4.

Figure 12:
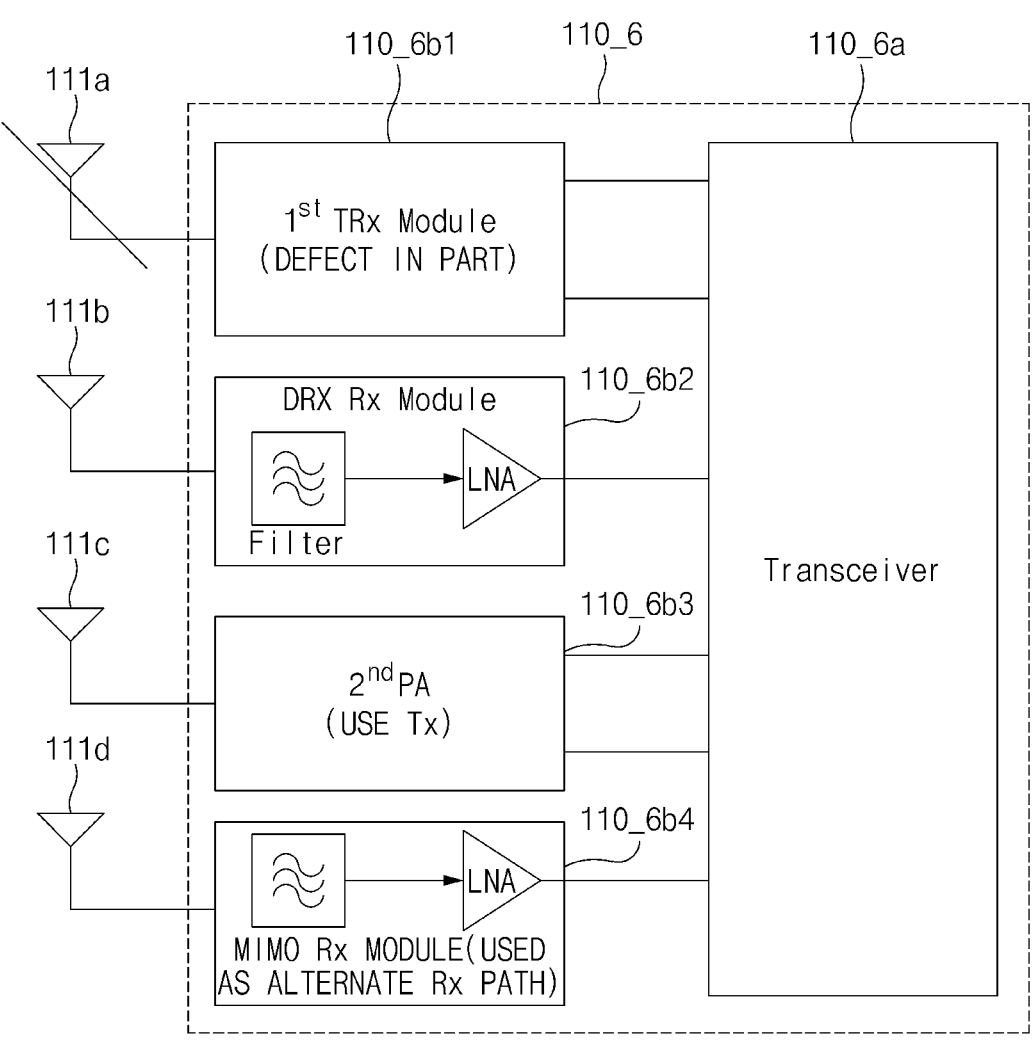
FIG. 12 is a diagram illustrating a part of a portable communication device structure for describing a setting of a TRx module-related bypass communication path according to various embodiments.

FIG. 12 is a diagram illustrating a part of a portable communication device structure for describing a setting of a TRx module-related bypass communication path according to various embodiments.

Referring to FIG. 12, a portable communication device 100 according to an embodiment may include first to fourth antennas 111a, 111b, 111c, and 111d and at least a part of a communication circuit 110_6. Such components of the communication circuit 110_6 shown in FIG. 12 may further include at least some of the components described above in FIGS. 2 to 10. Alternatively, at least some of the components of the communication circuit 110_6 shown in FIG. 12 may be omitted. For example, the communication circuit 110_6 may include only at least two of components except for a transceiver 110_6a. In addition, the portable communication device 100 may further include a communication processor (e.g., a communication processor 151 of FIG. 2) which controls operation of the communication circuit 110_6.

The communication circuit 110_6 may include the transceiver 110_6a, a first TRx module 110_6b1, a DRx LFEM 110_6b2, a transmit power amplifier 110_6b3, and/or a MIMO LFEM 110_6b4. The transceiver 110_6a may be a component which performs the same or similar function to the transceiver described above in FIG. 2. According to an embodiment, the transceiver 110_6a may support signal transmission and reception of at least some of the first TRx module 110_6b1, the DRx LFEM 110_6b2, the transmit power amplifier 110_6b3, and the MIMO LFEM 110_6b4.

The first TRx module 110_6b1 may be a component corresponding to (or which is the same as or similar to) the first TRx module described above in FIG. 2. The DRx LFEM 110_6b2 or the MIMO LFEM 110_6b4 may include the same or similar component to the DRx LFEM, the first MIMO LFEM, or the second MIMO LFEM described above in FIG. 2. The transmit power amplifier 110_6b3 may amplify a signal delivered by the transceiver 110_6a and may transmit the amplified signal through the third antenna 111c.

The first antenna 111a among the plurality of antennas may be connected with the first TRx module 110_6b1. The second antenna 111b may be connected with, for example, the DRx LFEM 110_6b2. The second antenna 111c may be connected with, for example, the transmit power amplifier 110_6b3. The fourth antenna 111d may be connected with, for example, the MIMO LFEM 110_6b4. At least some of the components included in the communication circuit 110_6 may deliver their state information to the communication processor. For example, the first TRx module 110_6b1 may identify information about its defective state and may deliver it to the communication processor. Alternatively, the communication processor may transmit a predefined signal to the first TRx module 110_6b1 and may identify a signal returned by the first TRx module 110_6b1 to determine whether the first TRx module 110_6b1 is defective.

When it is determined that the first TRx module 110_6b1 is defective, the communication processor may stop transmitting the signal using the first TRX module 110_6b1 and may determine a bypass communication path capable of replacing a transmit circuit function of the first TRx module 110_6b1. For example, the communication processor may determine the transmit power amplifier 110_6b3 as a hardware part to replace a transmit circuit function of the first TRx module 110_6b1. According to an embodiment, the entire first TRx module 110_6b1 is in a defective state, for example, when it is determined that both of a transmit circuit function and a receive circuit function in the first TRx module 110_6b1 are defective, the communication processor may determine the transmit power amplifier 110_6b3 as a hardware part to replace the transmit circuit function of the first TRx module 110_6b1 and may determine the MIMO LFEM 110_6b4 as a hardware part to replace the receive circuit function in the first TRx module 110_6b1. In this process, when the MIMO LFEM 110_6b4 supports 4×4 inputs and outputs, the communication processor may control to adopt at least one receive path to replace the receive circuit function (or the Rx path) of the first TRx module 110_6b1 among paths capable of being provided through the MIMO LFEM 110_6b4. For example, the communication processor may be configured to replace only any one receive path in the MIMO LFEM 110_6b4 with the receive path of the first TRx module 110_6b1. Alternatively, the communication processor 151 may be configured to select 2×2 input and output paths among 4×4 input and output paths or use all the 4×4 input and output paths.

According to various embodiments, the portable communication device 100 may support to operate the transmit power amplifier 110_6b3 and the MIMO LFEM 110_6b4 configured to support another frequency band, in a situation where a defect occurs in the part of the first TRx module 110_6b1, in only a specific situation for the case where the first TRX module 110_6b1 is replaced. For example, the communication processor of the portable communication device 100 may set the transmit power amplifier 110_6b3 and the MIMO LFEM 110_6b4 to replace the transmit function and the receive function of the first TRX module 110_6b1, only when operating a call function associated with an emergency call or a disaster situation. Additionally or alternatively, the communication processor may control to output information for requesting to repair a part of the first TRX module 110_6b1 on a display 140, in response to occurrence of the defect in the corresponding part. The information for requesting to repair the part may include, for example, service center connection information (e.g., a phone number or link information capable of accessing the Internet).

Figure 13:
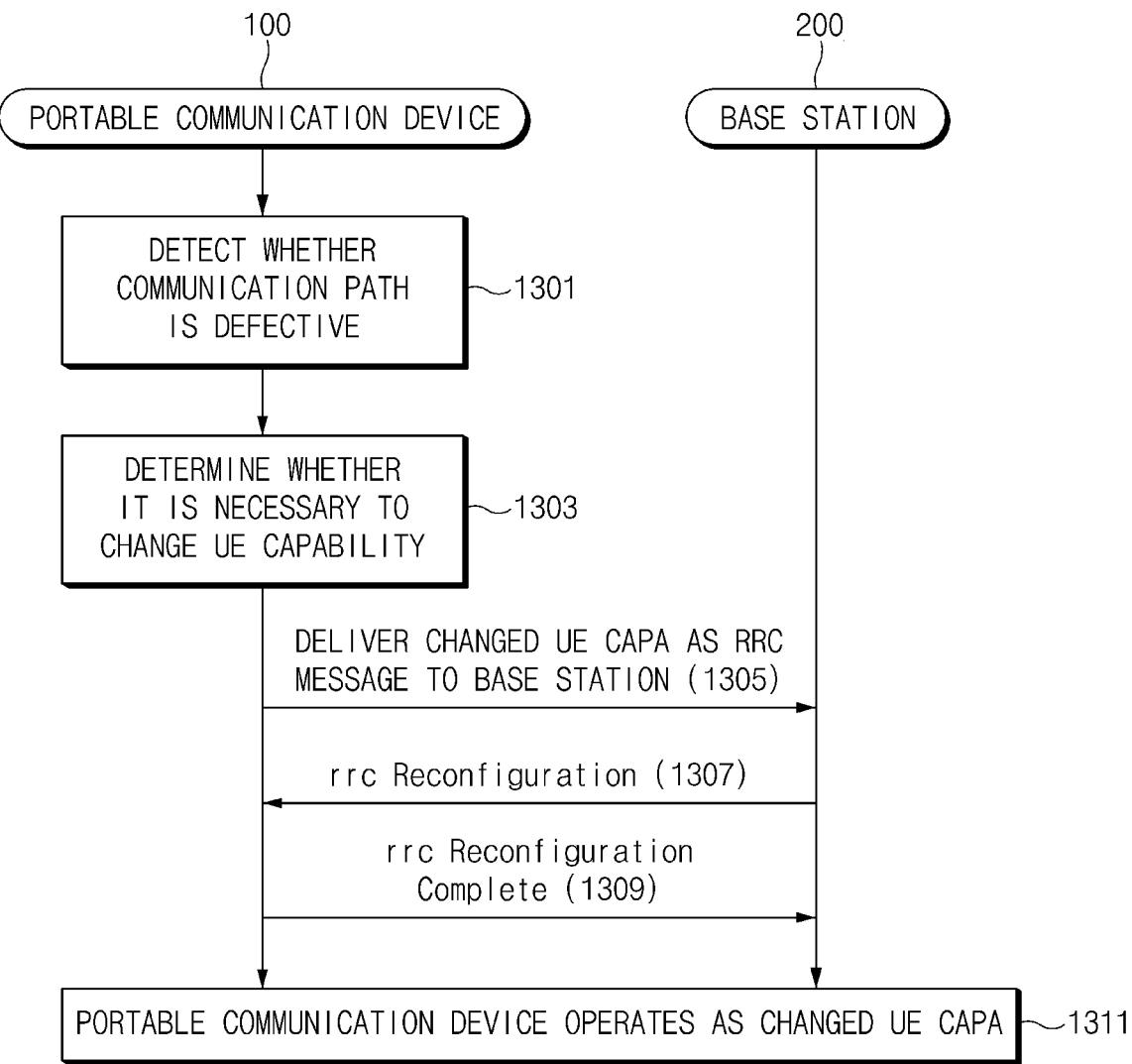
FIG. 13 is a signal flow diagram illustrating an example method of transmitting and receiving a signal with a base station associated with setting a bypass communication path according to various embodiments.

FIG. 13 is a signal flow diagram illustrating example transmitting and receiving of a signal with a base station associated with setting a bypass communication path according to various embodiments.

Referring to FIGS. 2 to 13, in operation 1031, at least one communication processor 151 in a portable communication device 100 including the communication circuit described above in FIGS. 2 to 13 may recognize (e.g., detect) a defect in a communication path (or a wireless communication path or an RF path). For example, the communication processor 151 may receive an indicator (or indication information, state information, or a state signal) indicating its state from at least one active element included in a communication circuit 110 (or at least one of the communication circuits described above in FIGS. 2 to 12). The communication processor 151 may identify which active element is in a defective state based on the received state information. Alternatively, at a specified period or when the portable communication device 100 is turned off from a turn-on state or when the quality of a specific communication function decreases to less than a specified value, the communication processor 151 may transmit a specified signal for identifying whether at least one active element included in the communication circuit 110 is defective, may analyze a feedback signal for the transmitted signal, and identify whether the at least one active element is defective.

In operation 1303, the communication processor 151 may determine whether it is necessary to change UE capability of the portable communication device. For example, the communication processor 151 may determine whether it is necessary to set a bypass communication path of a related communication path due to a defect in a specific communication path. According to an embodiment, when a specific active element associated with supporting a carrier aggregation (CA) function for a specific first communication frequency band is in a defective state, the communication processor 151 may set a bypass communication path including another active element which is disposed to transmit or receive another second communication frequency band and may be used to support the CA function. Herein, the second communication frequency band may be a frequency band adjacent to the first communication frequency band. Alternatively, a first antenna for transmitting and receiving a signal of the first communication frequency band may be the same as a second antenna for transmitting and receiving a signal of the second communication frequency band. Alternatively, a frequency band capable of being received by the second antenna may include a signal of the first and second communication frequency bands. When it is necessary to set a bypass communication path to support the CA function or the specific communication function, the communication processor 151 may determine that it is necessary to change capability of the portable communication device. When it is not necessary to change the UE capability of the portable communication device, the communication processor 151 may control not to perform a change in UE capability of a separate portable communication device although a defect occurs in the specific active element. According to an embodiment, the communication processor 151 may control to output guidance on occurrence of a defect in the communication path although it is not necessary to change the UE capability of the portable communication device.

When it is necessary to change the UE capability of the portable communication device, the communication processor 151 may change capability information of the portable communication device depending on the setting of the bypass communication path. In operation 1305, the communication processor 151 may deliver a radio resource control (RRC) message including the changed capability information (user equipment capability (UE CAPA)) of the portable communication device. The RRC message including the changed communication capability information (UE CAPA) may include information defining that the signal of the first communication frequency band is received using the bypass communication path. Alternatively, the RRC message including the changed communication capability information (UE CAPA) may include information defining a change in communication path and a change in active element according to it. The bypass communication path may include at least one bypass communication path among the bypass communication paths described above in FIGS. 2 to 12. Receiving the changed capability information of the portable communication device, the base station 200 may match and store the portable communication device and the changed capability information of the portable communication device and may generate RRC reconfiguration information to be provided to the portable communication device 100.

In operation 1307, the communication processor 151 may receive RRC reconfiguration information (rrc Reconfiguration) from the base station 200. The RRC reconfiguration information may include information defining signal transmission and reception of a specific frequency band of the portable communication device 100 depending on the changed capability information (or the bypass communication path) of the portable communication device.

In operation 1309, the communication processor 151 may transmit RRC reconfiguration complete information (rrc Reconfiguration Complete), as a result according to receiving RRC reconfiguration information and performing RRC reconfiguration, to the base station 200.

In operation 1311, the communication processor 151 may support a communication function based on the changed communication capability (UE CAPA) information. For example, the communication processor 151 may transmit a signal necessary for communication with the base station 200 through the bypass communication path or may receive a signal transmitted by the base station 200 through the bypass communication path.

FIG. 14 is a diagram illustrating an example of operating a portable communication device associated with setting a bypass communication path according to various embodiments.

According to an embodiment, a communication processor 151 of a portable communication device 100 may be configured to determine whether a communication path is defective on the basis of a signal transmission and reception quality index, other than identifying whether a defect occurs by transmitting and receiving a signal with an active element and close (or block) the communication path in which the defect occurs on the basis of it or use a bypass communication path. In this operation, the communication processor 151 of the portable communication device 100 may determine whether a defect occurs in the active element described above in FIGS. 1 to 13 and may selectively operate a setting of a bypass communication path. For example, the communication processor 151 may determine occurrence of the defect in the active element by transmitting and receiving a signal with the active element (e.g., transmitting and receiving a signal using an MIPI), while determining whether a defect occurs on the basis of the signal transmission and reception quality index described in FIG. 14. Herein, a defect may occur in a communication path including a passive element other than the occurrence of the defect in the communication path including the active element. In such a situation, the communication processor 151 may determine more accurate defect occurrence by determining whether a defect occurs in the communication path including the passive element on the basis of the signal transmission and reception quality index together with determining occurrence of the defect in the active element.

According to an embodiment, the communication processor 151 may perform signal transmission and reception for predefined communication paths and may identify a quality index of the transmitted and received signal. Herein, the communication processor 151 may identify only any one of a receive signal quality index or a transmit signal quality index depending on a characteristic of the communication path (e.g., at least one of a transmit path or a receive path). The transmitted and received signal quality index may include at least one of reference signal received power (RSRP), reference signal received quality (RSRQ), a signal to interference noise ratio (SINR), and a block error rate (BLER).

The communication processor 151 may identify whether the transmitted and received signal quality index indicates whether a defective index (e.g., a state less than a predefined threshold) above a predefined time. Referring to FIG. 14, when imbalance occurs in a state where RSRP of an Rx[2] path (or a receive path) is not good above 20 dBm compared to another path (or a receive path) and when such Rx imbalance (a poor state above a specified reference value) continues above a predefined certain time (24 hours), the communication processor 151 may determine the corresponding path (communication path) as a defective path. Herein, a threshold indicating the poor state and a magnitude of the certain time when a defective index is maintained may vary with a policy change or a user setting. For a Tx path (or a transmit path), when the UL BLER continues above a specified certain time (e.g., 12 hours) above a certain rate (e.g., 50%), the communication processor 151 may determine the corresponding Tx path as a defective path.

When a communication path where the defective index is maintained during a specified time is detected, the communication processor 151 of the portable communication device 100 may block the detected communication path. In the blocking process, the communication processor 151 may apply at least one of methods for blocking the signal communication path itself where the defective index occurs (or closing it or deactivating a port where a signal is transmitted or received through the corresponding communication path), deactivating the corresponding communication path in a CA combination, or setting a constraint of a layer or a MIMO order. According to an embodiment, the communication processor 151 may block a transmit path and a receive path in which a defect occurs not to use them and may process to use even a communication path in which the defect occurs when a specified condition occurs. For example, when operating a function associated with transmitting and receiving an emergency call or a disaster situation message, the communication processor 151 may change or reset some of element characteristics of the communication path in which the defect occurs and may process signal transmission and reception. In conjunction with setting a bypass communication path, as described above in FIGS. 1 to 13, the communication processor 151 may control to process transmission and reception of a signal transmitted or received through the communication path in which the defect occurs, through another communication path. According to an embodiment, for a MIMO path problem, the communication processor 151 may change a MIMO order (a layer). When a DRx path problem occurs, the communication processor 151 may change the DRx path to one of MIMO Rx paths. When a long term evolution secondary component carrier (LTE SCC) Tx path problem occurs, the communication processor 151 may block the Tx path in which the problem occurs and ULCA combo. When an NR Tx path problem occurs, the communication processor 151 may block ENDC of the NR Tx path and the NR combo combination. When the emergency call is required or in the disaster situation, the communication processor 151 may provide a minimal communication environment although at least one of the transmit path or the receive path is defective. For example, when a defect occurs in only some paths of 4×4 MIMO active elements, the communication processor 151 may be configured to operate 2×2 MIMO or a 1×1 communication path using the remaining paths in which the defect does not occur.

When a specified time elapses, after blocking the transmit path or the receive path indicating the defective index, the communication processor 151 of the portable communication device 100 may activate the blocked communication path during a predefined short time (e.g., seconds or minutes) and may identify whether the corresponding communication path still indicates the defective index. When there is a defective index problem (e.g., an imbalance program or a BLER above a certain rate) of the blocked communication path, after the specified time elapses, the communication processor 151 may maintain the blocked state. When the defective index is not detected, the communication processor 151 may release a setting of the blocked communication path and may reactivate the corresponding communication path. According to various embodiments, when a specific event occurs before a specific time elapses, for example, when the portable communication device is rebooted or when an airplane mode is on/off, the communication processor 151 may activate all communication paths associated with operating the communication function and may identify whether there is a path where the defective index is detected above the specified time.

Figure 15:
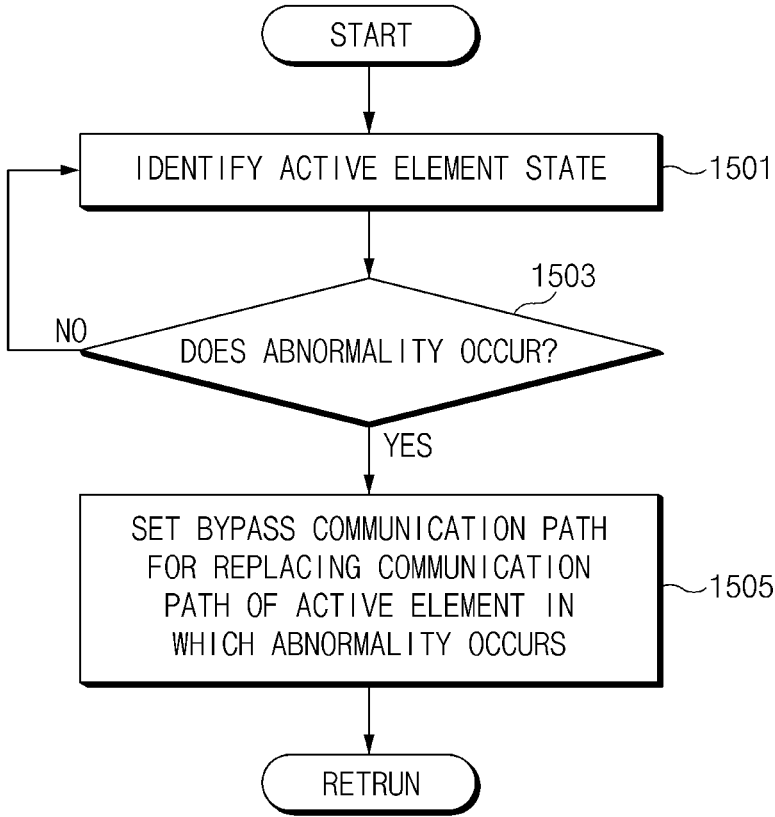
FIG. 15 is a flowchart illustrating an example method for processing a communication path in a portable communication device according to various embodiments.

FIG. 15 is a flowchart illustrating an example method of processing a communication path in a portable communication device according to various embodiments.

Referring to FIG. 15, in conjunction with the method for processing the communication path in the portable communication device according to an embodiment, in operation 1501, a communication processor 151 of a portable communication device 100 may perform identification of a state of an active element. For example, when a predefined specific event occurs, the communication processor 151 may perform the identification of the state of the active element. The condition of the occurrence of the specific event may include at least one of, for example, when the portable communication device 100 is turned on from a turn-off state, when an airplane mode changes from an on-state to an off-state, when a user input for identifying a communication path occurs, when a predefined certain period arrives, or when communication quality of a specific communication path decreases to less than a specified threshold. In conjunction with identifying the active element, an active element included in a communication circuit 110 (or at least one of the communication circuits described above in FIGS. 2 to 12) (e.g., an element capable of delivering a signal indicating its state information to the communication processor 151 through a communication interface (e.g., a MIPI or an I2C)) may deliver a signal indicating its state information to the communication processor 151 depending on at least one of requests of the communication processor 151, at a specified period or when the above-mentioned event occurs.

In operation 1503, the communication processor 151 may identify the received state information of the active element to identify whether there is an active element in which an abnormality occurs. When the abnormality does not occur (1503—No), the communication processor 151 may branch to operation 1501 to perform the operation from operation 1501 again. When the abnormality occurs (1503—Yes), in operation 1505, the communication processor 151 may set a bypass communication path for replacing a communication path of the active element in which the abnormality occurs. In this operation, the communication processor 151 may exclude the active element in which the abnormality occurs and may set a bypass communication path using another active element. In this regard, the communication processor 151 may select another active element capable of supporting to transmit or receive a signal of a first frequency band supported by the active element in which the abnormality occurs and may set a bypass communication path including the selected other active element. Alternatively, the communication processor 151 may exclude only some in which a problem occurs among communication characteristics of the active element in which the abnormality occurs and may set a new communication path using the active element, the communication characteristic of which is lowered. In addition, the communication processor 151 may select another active element and may reinforce performance according to the lowering of the communication characteristic. When even the active element in which the defect occurs is used as a communication path by lowering the communication characteristic, a range of selection capable of selecting other active elements for setting a bypass communication path may be widened. Thus, in setting the bypass communication path, the communication processor 151 may increase a possibility capable of selecting an active element having a relatively higher communication characteristic than other active elements.

When setting the bypass communication path, the communication processor 151 may update capability information of the portable communication device and may transmit the updated capability information to a base station. The base station may match and store the updated capability information with the portable communication device and may support to process a signal associated with supporting a communication function of the corresponding portable communication device 100 based on it.

Figure 16:
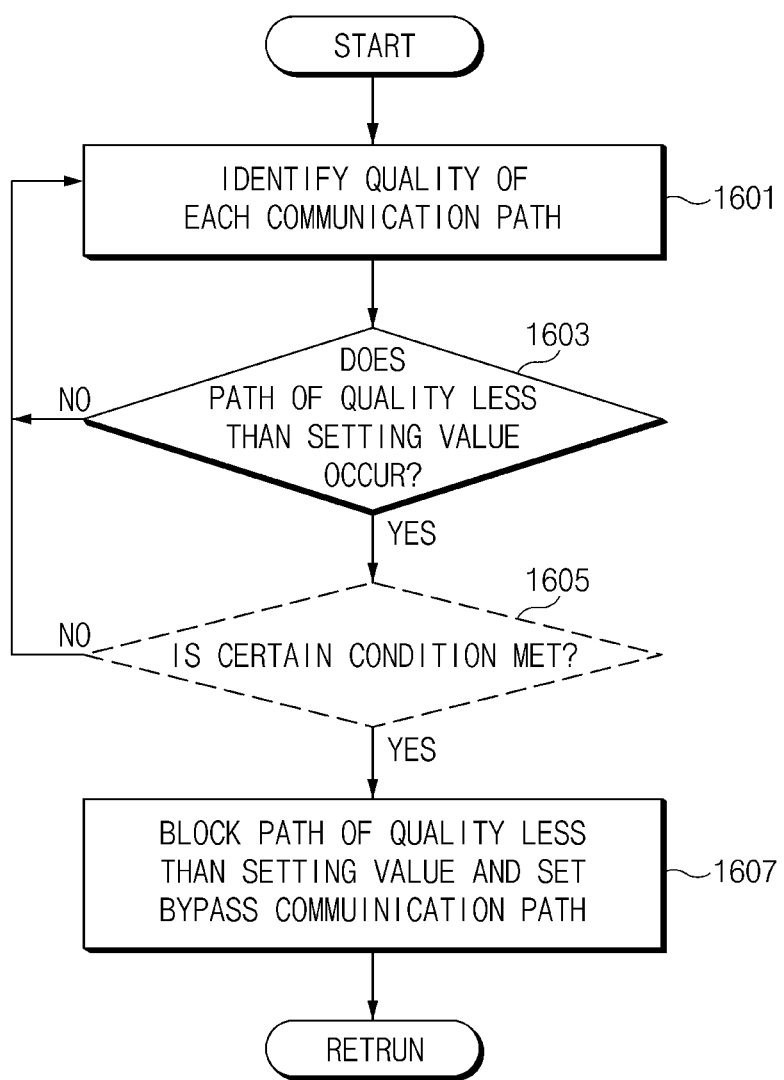
FIG. 16 is a flowchart illustrating an example method for processing a communication path in a portable communication device according to various embodiments.

FIG. 16 is a flowchart illustrating an example method of processing a communication path in a portable communication device according to various embodiments.

Referring to FIG. 16, in conjunction with the method for processing the communication path in the portable communication device according to an embodiment, in operation 1601, a communication processor 151 of a portable communication device 100 may perform identification of quality of each communication path. For example, when a predefined specific event occurs, the communication processor 151 may perform identification of quality of signal transmission and reception for all communication paths which transmit or receive signals through a communication circuit 110 (or communication paths predetermined to be used based on the communication circuit 110). The condition of the occurrence of the specific event may include at least one of, for example, when a defect occurs in a specific active element, when the portable communication device 100 is turned on from a turn-off state, when an airplane mode changes from an on-state to an off-state, when a user input for identifying a communication path occurs, when a predefined certain period arrives, or when communication quality of a specific communication path decreases to less than a specified threshold. In conjunction with identifying the quality of the communication path, the communication processor 151 may transmit a specified test signal through at least one transmit path or may detect receive signal quality of a signal received through at least one receive path.

In operation 1603, the communication processor 151 may identify whether there is a path of quality less than a setting value. When there is no path of quality less than the setting value (1603—No), the communication processor 151 may branch to operation 1601 to perform the operation from operation 1601 again.

When the communication path of the quality less than the setting value is detected (1603—Yes), in operation 1605, the communication processor 151 may identify whether a predefined certain condition is met. For example, the communication processor 151 may identify whether a specified defective index (or the quality less than the setting value) is maintained during a predefined reference time (e.g., seconds, minutes, or hours). When it is less than the reference time (1605—No), the communication processor 151 may branch to operation 1601 to perform the operation from operation 1601 again. The predefined certain condition may include a time when the defective index is continuously maintained or the number of times the defective index is detected within a predefined unit time (e.g., 30 minutes). In this operation, the communication processor 151 may set maintenance of a defective quality state during a predefined default time (e.g., seconds or minutes) as one-time occurrence of the defective index. According to an embodiment, in the method for processing the communication path in the portable communication device, operation 1605 may be omitted.

When the path of the quality less than the setting value is detected in operation 1603 or when the certain condition is met in operation 1605, in operation 1607, the communication processor 151 may block the path of the quality less than the setting value and may perform a setting of a bypass communication path. The setting of the bypass communication path may be performed in at least one of the schemes described above in FIGS. 1 to 13. The communication processor 151 may perform only blocking of a communication path of defective quality in which an abnormality occurs without setting the bypass communication path.

Figure 17:
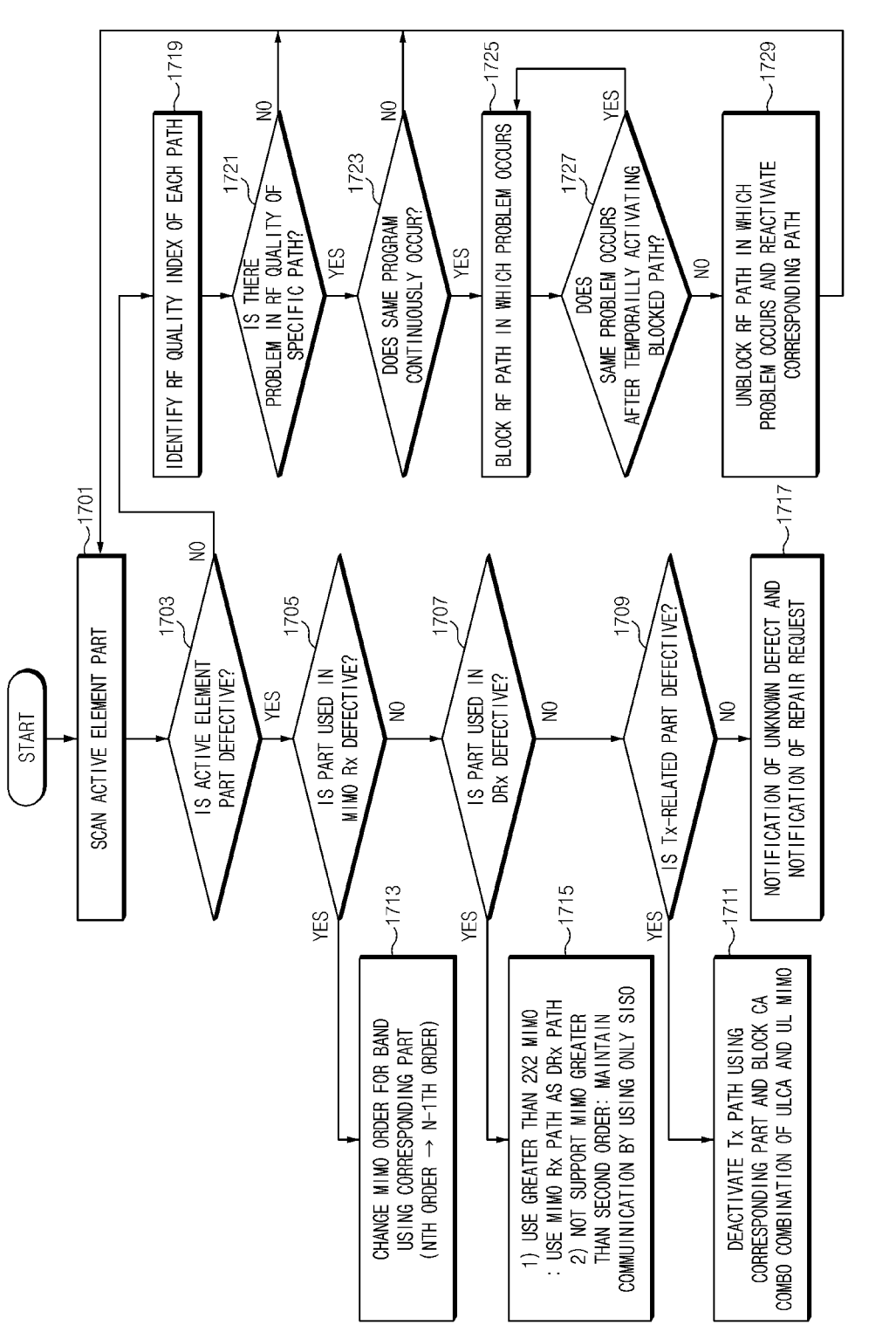
FIG. 17 is a flowchart illustrating an example method for processing a communication path in a portable communication device according to various embodiments.

FIG. 17 is a flowchart illustrating an example method of processing a communication path in a portable communication device according to various embodiments.

Referring to FIG. 17, in conjunction with the method for processing the communication path in the portable communication device, in operation 1701, a communication processor 151 may perform a scan operation for an active element part (an active (MIPI) part). According to an embodiment, the communication processor 151 may transmit a test signal for requesting state information of active elements included in a communication circuit 110 and may receive a response signal according to it.

In operation 1703, the communication processor may identify whether the active element part is defective. For example, the communication processor 151 may compare active element state information obtained by scanning the active element with predefined normal state active element state information to identify whether a defect occurs in the active element. Alternatively, the communication processor 151 may determine whether the defect occurs in the active element depending on whether information (or a signal) indicating a predefined normal state or defective state is received.

When the active element part is defective (1703—Yes), in operation 1705, the communication processor may identify whether a part used in MIMO Rx is defective. When the part used in the MIMO Rx is not defective (1705—No), in operation 1707, the communication processor may identify whether a part used in DRx is defective. When the part used in DRx is not defective (1707—No), in operation 1709, the communication processor may identify whether a Tx-related part is defective. Meanwhile, identifying whether the MIMO Rx part is defective, identifying whether the DRx part is defective, and then identifying whether the defect occurs in the Tx-related part are illustrated by way of non-limiting example in the above-mentioned description, and it will be understood that the disclosure is not limited to in such an order. For example, the communication processor 151 may perform respective operations (e.g., operations 1705, 1707, and 1709) in parallel irrespective of an order of the above-mentioned active elements or may perform related operations depending on an another order (e.g., an order of operations 1707, 1709, and 1705).

When the Tx-related part is defective (1709—Yes), in operation 1711, the communication processor may deactivate a Tx path and may block a CA combo combination of ULCA and UL MIMO.

Meanwhile, when the part used in the MIMO Rx is defective in operation 1705, in operation 1713, the communication processor may change a MIMO order for a frequency band using the corresponding part. For example, when MIMO is an nth order, the communication processor 151 may change to an n-lth order. When the defect occurs in the part used in DRx in operation 1707, in operation 1715, the communication processor may be configured to use a MIMO Rx path as a DRx path when it is possible to use greater than 2×2 MIMO in the communication circuit 110. Alternatively, when the communication circuit 110 does not support MIMO greater than a second order, the communication processor 151 may be configured to maintain communication using only single input single output (SISO). When the Tx-related part is not defective in operation 1709, in operation 1717, the communication processor 151 may provide a notification of occurrence of an unknown defect in communication and may control to output information for providing a notification of a repair request through a display 140 (or a speaker). As another example, operation 1717 may be omitted. In this case, after operation 1707, the communication processor 151 may determine that the defect occurs in the Tx-related part in operation 1709 and may perform related processing in operation 1711.

Meanwhile, when the active element part is not defective in operation 1703, in operation 1719, the communication processor may identify a signal transmission and reception quality (RF quality) index of each communication path. In this case, the communication processor 151 may identify quality indexes for all available communication paths through the communication circuit 110 or may identify the signal transmission and reception quality indexes of predefined communication paths available to the portable communication device 100.

In operation 1721, the communication processor may identify whether a problem is present in quality of a specific communication path. When there is no separate quality problem (1721—No), the communication processor 151 may branch to operation 1701 to control to perform the operation from operation 1701 again. The communication processor 151 may identify whether the signal quality of the specific communication path is less than a predefined reference value.

When the problem occurs in the quality of the specific communication path (1721—Yes), in operation 1723, the communication processor may identify whether the same problem continuously occurs. In this regard, the communication processor 151 may identify whether the situation where the problem occurs in the signal quality index is maintained above a predefined certain time. Alternatively, the communication processor 151 may identify whether the problem in the quality index occurs above a specified number of times during a specified time. When there is no continuity, the communication processor 151 may branch to operation 1701 to perform the operation from operation 1701 again.

When the signal quality index value is continuously less than the specified value (1723—Yes), in operation 1725, the communication processor may perform blocking of the communication path in which the problem occurs. In conjunction with the blocking, the communication processor 151 may deactivate a port through the corresponding communication path or may block a CA combo list using the corresponding communication path.

In operation 1727, the communication processor may temporarily activate the blocked communication path and may identify whether the same problem occurs. When the same problem occurs (1727—Yes), it may return to operation 1725 to perform the operation from operation 1725 again. When the same problem does not occur (1727—No), in operation 1729, the communication processor may unblock the communication path in which the problem occurs and may reactivate the corresponding communication path.

The transmission and reception signal for the signal quality index or the defective index is described in the above-mentioned description, but the communication processor 151 may identify a transmit signal quality index associated with a transmit path depending on a characteristic of the communication path and may identify a receive signal quality index associated with a receive path.

According to an embodiment, the method for processing the communication path in FIG. 17 is described with reference to the drawing, but the respective operations described in FIG. 17 may use other examples described in the respective operations described above in FIGS. 15 and 16 in the same manner. Furthermore, while supporting the bypass communication path in the above-mentioned description, the communication processor 151 of the disclosure may be configured to close or block a specific communication path, depending on a situation.

As described above, the portable communication device 100 according to an embodiment may provide a customer with maximal DATA T-throughput (PUT) availability within a possible range although a defect occurs in an RF part and an RF path and may provide strength in stable call attach using an alternate path rather than deactivating a band (a frequency band) in a conventional method. Furthermore, the portable communication device 100 of the disclosure may provide improved performance in the current communication device state depending on providing a subdivided bypass communication path and may provide a customer to the right to determine whether to repair the portable communication device to consider an economic aspect from the customer's point of view and save repair costs from the manufacturer's point of view.

Furthermore, the disclosure may provide an improved effect for reducing RF current consumption used to continuously operate a defective path without using a path in which a problem occurs. For example, the portable communication device in the disclosure may reduce current in an RF part and a modem clock driving current to operate a defective path. Particularly, for a defect in a Tx path, the portable communication device may considerably reduce current consumed by a power amplifier (PA) by continuously using a Tx Max power (a transmit maximum power), thus providing a heating improvement effect. Furthermore, as an undesired signal is reflected from a defective path, a risk of damage by a fire in an additional circuit may occur, the portable communication device of the disclosure may prevent and/or reduce the occurrence of such a problem.

According to an example embodiment, a portable communication device (e.g., a portable communication device 100 of any one of FIGS. 1 to 18) of the disclosure described above may include a communication processor (e.g., any one of communication processors described in FIGS. 1 to 18), at least one antenna (e.g., at least one antenna described in FIGS. 1 to 18), and a communication circuit (a communication circuit or a communication module described in FIGS. 1 to 18) disposed between the communication processor and the at least one antenna and includes a plurality of active elements comprising circuitry located on a plurality of radio frequency communication paths configured to respectively or selectively support a plurality of radio frequency bands. The communication processor may be configured to: identify whether at least some of the plurality of active elements are in an abnormal state and, based on an abnormal state of a first active element configured to support delivery of a signal of a first frequency band among the at least some of the plurality of active elements being detected, control the portable communication device to deliver the signal of the first frequency band based on a second active element different from the first active element among the plurality of active elements.

According to an example embodiment, the communication processor may be configured to block a communication path including the first active element, the abnormal state of which is detected.

According to an example embodiment, the communication processor may be configured to block a carrier aggregation combo combination including the first active element, the abnormal state of which is detected.

According to an example embodiment, the communication processor may be configured to write capability information for providing a notification of a state where the signal of the first frequency band is processed based on the second active element and control the communication circuit to transmit the written capability information to a base station.

According to an example embodiment, the communication processor may be configured to control the portable communication device to change one of a plurality of receive paths of the first active element to a DRx path included (or disposed) in the communication circuit, based on the first active element being a multi-input multi-output (MIMO) receive circuit.

According to an example embodiment, the communication processor is configured to: identify whether the at least some of the plurality of active elements are in the abnormal state, based on at least one of the portable communication device being turned on from a turn-off state, an airplane mode changing from an on-state to an off-state, an input for identifying a communication path occurring, a specified certain period arriving, or communication quality of a specific communication path decreasing to less than a specified threshold occurring.

According to an example embodiment, the communication processor may be configured to: transmit a specified scan signal to the at least some of the plurality of active elements and determine whether the at least some of the plurality of active elements are in the abnormal state based on a response signal corresponding to the transmitted scan signal.

According to an example embodiment, the communication processor is configured to: lower a communication characteristic of the first active element and process delivery of the signal of the first frequency band using the first active element, the communication characteristic of which is lowered.

According to an example embodiment, the communication processor is configured to change a multi-input multi-output (MIMO) order, based on the first active element being a MIMO receive circuit.

According to an example embodiment of the disclosure, a method for processing a communication path in a portable communication device of the disclosure may include: identifying whether at least some of a plurality of active elements included in a communication circuit disposed between an antenna and a communication processor are in an abnormal state and, based on an abnormal state of a first active element configured to support delivery of a signal of a first frequency band among the at least some of the plurality of active elements being detected, controlling the portable communication device to deliver the signal of the first frequency band based on a second active element different from the first active element among the plurality of active elements.

According to an example embodiment, the method may further include: at least one of blocking a communication path including the first active element, the abnormal state of which is detected, and blocking a carrier aggregation combo combination including the first active element, the abnormal state of which is detected.

According to an example embodiment, the method may further include: writing capability information for providing a notification of a state where the signal of the first frequency band is processed based on the second active element and transmitting the written capability information to a base station.

According to an example embodiment, the controlling may include: changing one of a plurality of receive paths of the first active element to a DRx path included (or disposed) in the communication circuit, based on the first active element being a multi-input multi-output (MIMO) receive circuit.

According to an example embodiment, the identifying of whether the at least some of the plurality of active elements are in the abnormal state may include: identifying whether the at least some of the plurality of active elements are in the abnormal state, based on at least one of the portable communication device being turned on from a turn-off state, an airplane mode changing from an on-state to an off-state, an input for identifying a communication path occurring, a specified certain period arriving, or communication quality of a specific communication path decreasing to less than a specified threshold occurring.

According to an example embodiment, the identifying of whether the at least some of the plurality of active elements are in the abnormal state may include: transmitting a specified scan signal to the at least some of the plurality of active elements and determining whether the at least some of the plurality of active elements are in the abnormal state based on a response signal corresponding to the transmitted scan signal.

According to an example embodiment, the controlling may include: lowering a communication characteristic of the first active element and processing delivery of the signal of the first frequency band using the first active element, the communication characteristic of which is lowered.

According to an example embodiment, a portable communication device (e.g., a portable communication device 100 of any one of FIGS. 1 to 18) of the disclosure may include: a communication processor (e.g., any one of communication processors described in FIGS. 1 to 18), at least one antenna (e.g., at least one antenna described in FIGS. 1 to 18), and a communication circuit (e.g., a communication circuit or a communication module described in FIGS. 1 to 18) disposed between the communication processor and the at least one antenna and configured to support a plurality of radio frequency transmit paths and a plurality of radio frequency receive paths to respectively or selectively support a plurality of radio frequency bands. The communication processor may be configured to: determine whether a first transmit path is abnormal based on signal quality of the first transmit path for transmitting a first radio frequency signal among the plurality of radio frequency transmit paths and may control the portable communication device to change a path to output the first radio frequency signal through a second transmit path different from the first transmit path, based on an abnormality occurring in the first transmit path.

According to an example embodiment, the communication processor may be configured to: determine whether a first receive path is abnormal based on signal quality of the first receive path for receiving a second radio frequency signal among the plurality of radio frequency receive paths and may control the portable communication device to change a path to receive the second radio frequency signal through a second receive path, based on an abnormality occurring in the first receive path.

According to an example embodiment, the communication processor may be configured to: control to change a multi-input multi-output (MIMO) order, based on the first receive path including MIMO Rx, and change one of the MIMO Rx paths to a DRx path included in the communication circuit.

According to an example embodiment, the communication processor is configured to output an alarm corresponding to occurrence of a defect in a part of the communication circuit based on on the determination of whether the first transmit path is abnormal.

Figure 18:
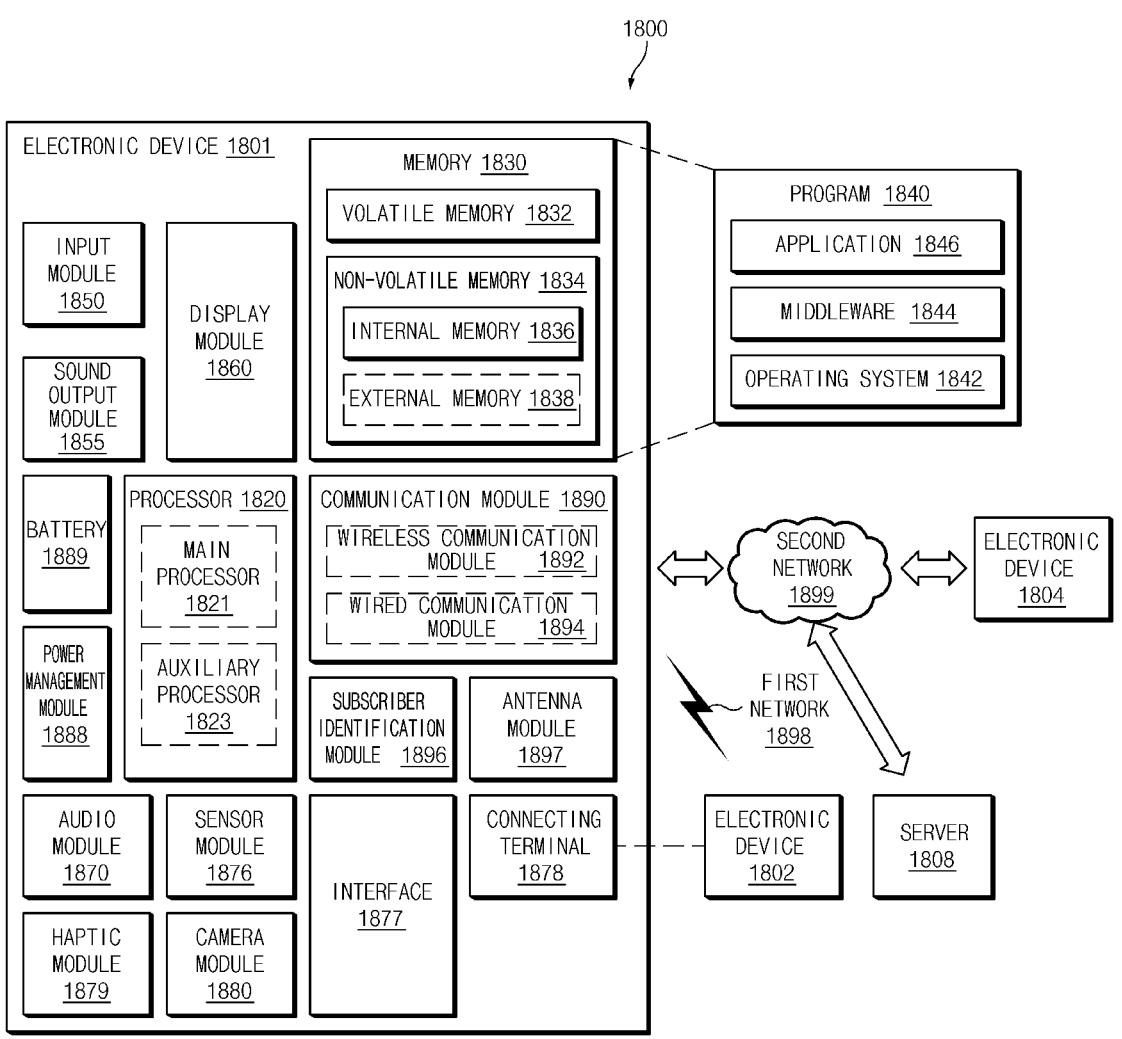
FIG. 18 is a block diagram illustrating an example electronic device in a network environment, according to various embodiments.

FIG. 18 is a block diagram illustrating an example electronic device 1801 in a network environment 1800 according to various embodiments.

Referring to FIG. 18, the electronic device 1801 in the network environment 1800 may communicate with an electronic device 1802 via a first network 1898 (e.g., a short-range wireless communication network), or at least one of an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, a memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In various embodiments, at least one (e.g., the connecting terminal 1878) of the components may be omitted from the electronic device 1801, or one or more other components may be added in the electronic device 1801. In various embodiments, some of the components may be implemented as single integrated circuitry. For example, some (e.g., the sensor module 1876, the camera module 1880, or the antenna module 1897) of the components may be implemented as embedded in the display module 1860 (e.g., a display).

The processor 1820 may execute, for example, software (e.g., a program 1840) to control at least one other component (e.g., a hardware or software component) of the electronic device 1801 coupled with the processor 1820, and may perform various data processing or computation. According to an embodiment, as at least part of the data processing or computation, the processor 1820 may load a command or data received from another component (e.g., the sensor module 1876 or the communication module 1890) in a volatile memory 1832, process the command or the data stored in the volatile memory 1832, and store resulting data in a non-volatile memory 1834. According to an embodiment, the processor 1820 may include a main processor 1821 (e.g., a central processing unit (CPU) or an application processor (AP)), and an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 1821. When the electronic device 1801 includes the main processor 1821 and the auxiliary processor, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823. According to an embodiment, the auxiliary processor 1823 (e.g., a neural network processing device) may include a hardware structure specified for processing an artificial intelligence (AI) model. The AI model may be generated through machine learning. The learning may be performed by the electronic device 1801 performing the AI model, and may be performed through an additional server (e.g., the server 1808). A learning algorithm may include, for example, a supervised learning algorithm, an unsupervised learning algorithm, a semi-supervised learning algorithm, or a reinforcement learning algorithm, but the disclosure is not limited thereto. The AI model may include a plurality of artificial neural network (ANN) layers. The ANN may include a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks or the combination of the above networks, but the disclosure is not limited thereto. The AI model may additionally or alternatively include a software structure, in addition to a hardware structure.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by other component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 1860 may visually provide information to the outside (e.g., a user) of the electronic device 1801. The display module 1860 may include, for example, a display, a hologram device, or a projector and control circuitry to control a corresponding one of the display, hologram device, and projector. According to an embodiment, the display module 1860 may include touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850, or output the sound via the sound output module 1855 or an external electronic device (e.g., the electronic device 1802) (e.g., speaker of headphone) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to an embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). The corresponding communication module among the communication modules may communicate with the external electronic device via the first network 1898 (e.g., a short-range communication network, such as Bluetooth™, wireless-fidelity (WiFi) direct, or infrared data association (IrDA)) or the second network 1899 (e.g., a long-range communication network, such as a legacy cellular network, 5G network, next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify or authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network and a next-generation communication technology, for example, a new radio (NR) access technology after a 4G network. The NR access technology may support high-speed transmission for high capacity data (enhanced mobile broadband; eMBB), terminal power minimizing and multiple terminal access (massive machine type communication; mMTC), or ultra-reliable and low-latency communications (URLLC). The wireless communication module 1892 may support a high-frequency band (e.g., mmWave band) to achieve, for example, a higher data rate. The wireless communication module 1892 may support various technologies, for example, beamforming, massive multiple-input and multiple-output (MIMO), Full-dimensional MIMO, an array antenna, analog beam-forming, or a large-scale antenna, to secure performance in high frequency bands. The wireless communication module 1892 may support various requirements defined in the electronic device 1801, the external electronic device (e.g., the electronic device 1804) or the network system (e.g., the second network 1899). According to an embodiment, the wireless communication module 1892 may support a peak data rate (e.g., 20 Gbps or more) for eMBB realization, loss coverage (e.g., 164 dB or less) for mMTC realization, or U-plane latency (e.g., 0.5 ms or less, or the round trip of 1 ms or less in each of a downlink (DL) and an uplink (UL)) for URLCC realization.

The antenna module 1897 may transmit or receive a signal or power to or from the outside (e.g., the external electronic device) of the electronic device 1801. According to an embodiment, the antenna module 1897 may include an antenna including a radiating element including a conductive material or a conductive pattern formed in or on a substrate (e.g., PCB). According to an embodiment, the antenna module 1897 may include a plurality of antennas (e.g., an array antenna). In such a case, at least one antenna appropriate for a communication scheme used in the communication network, such as the first network 1898 or the second network 1899, may be selected, for example, by the communication module 1890 from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

According to various embodiments, the antenna module 1897 may form an mmWave antenna module. According to an embodiment, the mmWave antenna module may include a printed circuit board, an RFIC disposed on a first surface (e.g., a bottom surface) of the printed circuit board, or disposed adjacent to the first surface to support the specific high frequency band (e.g., mmWave band), and a plurality of antennas (e.g., an array antenna) disposed on a second surface (e.g., a top surface or a side surface) of the printed circuit board or disposed adjacent to the second surface to transmit or receive a signal having the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the external electronic devices 1802 or 1804 may be a device of a same type as, or a different type, from the electronic device 1801. According to an embodiment, all or some of operations to be executed at the electronic device 1801 may be executed at one or more of the external electronic devices 1802, 1804, or 1808. For example, when the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide an ultra-latency service using, for example, distributed computing or mobile edge computing. According to various embodiments, the external electronic device 1804 may include the Internet of things (IoT). The server 1808 may be an artificial server using machine learning and/or a neural network. According to an embodiment, the external electronic device 1804 or the server 1808 may be included in the second network 1899. The electronic device 1801 may be applied to an artificial intelligence service (e.g., a smart home, a smart city, a smart car, or healthcare service) based on the 5G communication technology and the IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities and some of multiple entities may be separately disposed on the other components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A portable communication device, comprising:
a communication processor;
at least one antenna; and
a communication circuit disposed between the communication processor and the at least one antenna, the communication circuit including a plurality of active elements located on a plurality of radio frequency communication paths configured to respectively or selectively support a plurality of radio frequency bands,
wherein the communication processor is configured to:
identify whether at least some of the plurality of active elements are in an abnormal state and, based on an abnormal state of a first active element configured to support delivery of a signal of a first frequency band among the at least some of the plurality of active elements being identified, control the portable communication device to change a communication path including the first active element to a communication path including a second active element different from the first active element among the plurality of active elements for the signal of the first frequency band,
wherein the communication processor is configured to control the communication circuit to transmit capability information to a base station, and
wherein the capability information includes a notification about a status of processing the signal of the first frequency band based on the second active element.

2. The portable communication device of claim 1, wherein the communication processor is configured to:
block the communication path including the first active element when the first active element is the abnormal state.

3. The portable communication device of claim 1, wherein the communication processor is configured to:
block a carrier aggregation combo combination including the first active element when the first active element is the abnormal state.

4. The portable communication device of claim 1, wherein the communication processor is configured to:
write the capability information including the notification about the status of processing the signal of the first frequency band based on the second active element.

5. The portable communication device of claim 1, wherein the communication processor is configured to control the portable communication device to change one of a plurality of receive paths of the first active element to a diversity receiver (DRx) path included in the communication circuit, based on the first active element being a multi-input multi-output (MIMO) receive circuit.

6. The portable communication device of claim 1, wherein the communication processor is configured to:
identify whether the at least some of the plurality of active elements are in the abnormal state, based on at least one of the portable communication device being turned on from a turn-off state, an airplane mode changing from an on-state to an off-state, an input for identifying a communication path occurring, a specified certain period arriving, or communication quality of a specific communication path decreasing to less than a specified threshold occurring.

7. The portable communication device of claim 1, wherein the communication processor is configured to:
transmit a specified scan signal to the at least some of the plurality of active elements and determine whether the at least some of the plurality of active elements are in the abnormal state based on a response signal corresponding to the transmitted scan signal.

8. The portable communication device of claim 1, wherein the communication processor is configured to:

lower a communication characteristic of the first active element and process delivery of the signal of the first frequency band using the first active element when the communication characteristic is lowered.

9. The portable communication device of claim 8, wherein the communication processor is configured to:

change a multi-input multi-output (MIMO) order, based on the first active element being a MIMO receive circuit.

10. A method for processing a communication path in a portable communication device, the method comprising:

identifying whether at least some of a plurality of active elements included in a communication circuit disposed between an antenna and a communication processor are in an abnormal state; and based on an abnormal state of a first active element for supporting delivery of a signal of a first frequency band among the at least some of the plurality of active elements being detected, controlling the portable communication device to change a communication path associated with the first active element to a communication path associated with a second active element different from the first active element among the plurality of active elements to deliver the signal of the first frequency band, wherein the method further comprises controlling the communication circuit to transmit capability information to a base station, and wherein the capability information includes a notification about a status of processing the signal of the first frequency band based on the second active element.

11. The method of claim 10, further comprising:

at least one of blocking a communication path including the first active element when the first active element is the abnormal state, and blocking a carrier aggregation combo combination including the first active element when the first active element is the abnormal state.

12. The method of claim 10, further comprising:

writing the capability information including the notification about the status of processing the signal of the first frequency band based on the second active element.

13. The method of claim 10, wherein the controlling includes:

changing one of a plurality of receive paths of the first active element to a diversity receiver (DRx) path included in the communication circuit, based on the first active element being a multi-input multi-output (MIMO) receive circuit.

14. The method of claim 10, wherein the identifying of whether the at least some of the plurality of active elements are in the abnormal state includes:

identifying whether the at least some of the plurality of active elements are in the abnormal state, based on at least one of the portable communication device being turned on from a turn-off state, an airplane mode changing from an on-state to an off-state, an input for identifying a communication path occurring, a specified certain period arriving, or communication quality of a specific communication path decreasing to less than a specified threshold occurring.

15. The method of claim 10, wherein the identifying of whether the at least some of the plurality of active elements are in the abnormal state includes:

transmitting a specified scan signal to the at least some of the plurality of active elements and determining whether the at least some of the plurality of active elements are in the abnormal state based on a response signal corresponding to the transmitted scan signal.

16. The method of claim 10, wherein the controlling includes:

lowering a communication characteristic of the first active element and processing delivery of the signal of the first frequency band using the first active element when the communication characteristic is lowered.

17. A portable communication device, comprising:

a communication processor;

at least one antenna; and a communication circuit disposed between the communication processor and the at least one antenna and configured to support a plurality of radio frequency transmit paths and a plurality of radio frequency receive paths to respectively or selectively support a plurality of radio frequency bands, wherein the communication processor is configured to: determine whether a first transmit path is abnormal based on signal quality of the first transmit path for transmitting a first radio frequency signal among the plurality of radio frequency transmit paths and control the portable communication device to change a path to output the first radio frequency signal through a second transmit path different from the first transmit path, based on an abnormality occurring in the first transmit path, and wherein the communication processor is configured to control the portable communication device to change a multi-input multi-output (MIMO) order, based on a first receive path including MIMO Rx, and change one of MIMO Rx paths to a diversity receiver (DRx) path included in the communication circuit.

18. The portable communication device of claim 17, wherein the communication processor is configured to: determine whether a first receive path is abnormal based on signal quality of the first receive path for receiving a second radio frequency signal among the plurality of radio frequency receive paths and control the portable communication device to change a path to receive the second radio frequency signal through a second receive path, based on an abnormality occurring in the first receive path.

19. The portable communication device of claim 17, wherein the communication processor is configured to:

output an alarm corresponding to occurrence of a defect in a part of the communication circuit based on the determination of whether the first transmit path is abnormal.

* * * * *